United States Patent
Nespor

(10) Patent No.: US 10,343,582 B2
(45) Date of Patent: Jul. 9, 2019

(54) FLATBED TOW TRUCK ASSEMBLY AND METHOD OF USE

(71) Applicant: Ronald R. Nespor, Sarasota, FL (US)

(72) Inventor: Ronald R. Nespor, Sarasota, FL (US)

(*) Notice: Subject to any disclaimer, the term of this patent is extended or adjusted under 35 U.S.C. 154(b) by 585 days.

(21) Appl. No.: 14/461,855

(22) Filed: Aug. 18, 2014

(65) Prior Publication Data

US 2015/0343937 A1    Dec. 3, 2015

Related U.S. Application Data

(60) Continuation-in-part of application No. 13/442,996, filed on Apr. 10, 2012, now Pat. No. 8,807,906, which is a division of application No. 13/021,704, filed on Feb. 4, 2011, now Pat. No. 8,152,435, which is a continuation-in-part of application No. 12/701,555, filed on Feb. 6, 2010, now Pat. No. 7,909,560.

(51) Int. Cl.
    *B60P 3/07*      (2006.01)
    *B60P 3/12*      (2006.01)

(52) U.S. Cl.
    CPC .................. *B60P 3/07* (2013.01); *B60P 3/122* (2013.01)

(58) Field of Classification Search
    CPC .................................... B60P 3/07; B60P 3/122
    USPC ........ 410/8–12, 97, 104, 106, 110, 115–116; 414/537–538, 563
    See application file for complete search history.

(56) References Cited

U.S. PATENT DOCUMENTS

| | | | |
|---|---|---|---|
| 4,795,303 A | 1/1989 | Bubik | |
| 4,813,841 A * | 3/1989 | Eischen | B60P 1/24 298/12 |
| 4,818,162 A | 4/1989 | Zukowski | |
| 4,842,470 A | 6/1989 | Hubbard | |
| 4,875,822 A | 10/1989 | Nespor | |
| 4,890,852 A | 1/1990 | Chapman | |
| 4,929,142 A | 5/1990 | Nespor | |
| 5,006,033 A | 4/1991 | McConnell | |
| 5,061,147 A | 10/1991 | Nespor | |
| 5,246,329 A | 9/1993 | Farrell | |

(Continued)

FOREIGN PATENT DOCUMENTS

KR      20-0231143      7/2001

*Primary Examiner* — Stephen T Gordon
(74) *Attorney, Agent, or Firm* — Allen D Hertz, P. A.; Allen D. Hertz

(57) ABSTRACT

A flatbed vehicle carrier assembly comprising a carrier body subassembly including a carrier floor supported by a carrier body slide enabling sill frame. An intermediate subframe subassembly is capable of sliding and being pivotally integrated with a slide enabling tilt and pivotal control subassembly, which is pivotally secured therebetween to a mounting platform support assembly. A pivot control device provides a means to rotate and rearwardly transfer and posture the intermediate subframe. The carrier body sill frame is slideably assembled to the intermediate subframe, being driven by a longitudinal control actuator. A ramp can be pivotally integrated into a loading end of the carrier body subassembly. The carrier and ramp floors are fabricated of a series of interlocking extrusion members. The edge rails can include one or more hook receptacles for receiving flat hooks for tie downs or a slot for receiving one or more sliding latching element assemblies.

20 Claims, 30 Drawing Sheets

(56) References Cited

U.S. PATENT DOCUMENTS

| | | |
|---|---|---|
| 5,249,909 A | 10/1993 | Roberts et al. |
| 5,516,246 A | 5/1996 | Helton |
| 5,529,454 A | 6/1996 | Aim et al. |
| 5,720,526 A | 2/1998 | Roberts |
| 5,779,431 A | 7/1998 | Aim et al. |
| 5,846,047 A | 12/1998 | Riekki |
| 5,906,470 A | 5/1999 | Desjardins |
| 5,951,235 A | 9/1999 | Young et al. |
| 5,984,614 A | 11/1999 | Weber |
| 6,250,861 B1 | 6/2001 | Whitehead |
| 6,276,890 B1 | 8/2001 | Pratt |
| 6,336,783 B1 | 1/2002 | Young et al. |
| 6,354,785 B2 | 3/2002 | Maeno |
| 6,461,096 B1 | 10/2002 | Mentele et al. |
| 6,848,871 B1 * | 2/2005 | Cottrell ............... B60P 3/08 410/12 |
| 7,401,860 B2 | 7/2008 | Kraenzle |
| 7,874,774 B2 * | 1/2011 | Peterson ............ B60P 7/0815 410/104 |
| 7,909,560 B1 | 3/2011 | Nespor |
| 8,152,435 B2 | 4/2012 | Nespor |
| 8,807,906 B2 * | 8/2014 | Nespor ............... B60P 3/122 414/537 |
| 2006/0153658 A1 | 7/2006 | Watson et al. |
| 2006/0182510 A1 | 8/2006 | Cash |
| 2008/0159838 A1 | 7/2008 | Sherer |
| 2009/0025154 A1 | 1/2009 | Smith |
| 2011/0028392 A1 | 2/2011 | Greenberg |
| 2011/0293386 A1 | 12/2011 | Plazek |
| 2012/0019572 A1 | 1/2012 | Lim |
| 2013/0149084 A1 | 6/2013 | Jaeger et al. |

* cited by examiner

FLATBED TOW TRUCK ASSEMBLY AND METHOD OF USE

CROSS-REFERENCE TO RELATED APPLICATIONS

This Non-Provisional Patent Application is a Continuation-In-Part claiming the benefit of U.S. patent application Ser. No. 13/442,996, filed on Apr. 10, 2012 (Issuing as U.S. Pat. No. 8,807,906), which is a Divisional Patent Application claiming the benefit of U.S. patent application Ser. No. 13/021,704, filed on Feb. 4, 2011 (Issued as U.S. Pat. No. 8,152,435 on Apr. 10, 2012), which is Continuation In Part claiming the benefit of U.S. patent application Ser. No. 12/701,555, filed Feb. 6, 2010 (Issued as U.S. Pat. No. 7,909,560 on Mar. 22, 2011), all of which are hereby incorporated by reference herein in their entireties.

FIELD OF THE INVENTION

The present disclosure generally relates to an apparatus and method for a transporting vehicles and other similar sized objects. More particularly, the present disclosure relates to a vehicle carrier employing a moveable platform having associated features integrated therewith for loading and transporting cargo, including vehicles.

BACKGROUND OF THE INVENTION

The purpose of the invention is to provide an apparatus for transporting large objects such as vehicles. Vehicle transport systems, commonly referred to as tow trucks, have been evolving in parallel with the automobile. There are several classifications of towing equipment, including a boom, a hook and chain, a wheel-lift, a flatbed, and an integrated system.

A boom is generally utilized for recovering vehicles that are in a ditch, culvert, over an embankment, or any place the vehicle cannot be safely backed-up to. A boom may or may not be used for towing a recovered vehicle.

A hook and chain, also known as a "sling" or "belt lift", loops chains around the vehicle frame or axle, which is drawn aloft by a boom winch to rest against a pair of heavy rubberized mats so the customer's vehicle can be towed on its other axle. In today's environment, the use of slings is very limited, as they are known to scratch bumpers of cars. They are generally used for towing vehicles that have been in an accident or have one or two of the front or rear wheels missing or for pickup trucks and other vehicles that have steel bumpers.

A wheel-lift evolved from the hook and chain technology, utilizing a large metal yoke that is fitted under the front or rear wheels to cradle them. The wheel-lift raises the front or rear end of the vehicle off the ground by a pneumatic or hydraulic hoist so it can be towed. This apparatus generally picks up the drive wheels of the vehicle (i.e. the front wheels if it is front wheel drive, the rear wheels if it is rear wheel drive). The lift only touches the tires, limiting any risk of damage to the towed vehicle.

A flatbed, also referred to as a rollback or a slide back carrier, provides a carrier body placed over the entire trailer portion of a truck. The bed can be hydraulically inclined and moved to ground level, allowing the customer's vehicle to be placed onto the carrier body under its own power or pulled by a winch.

An integrated lift, also referred to as a "Self Loader" Snatcher, Quick Pick or Repossession Truck, integrates a boom and wheel-lift into a single unit. The integrated lift is generally installed onto light duty trucks to repossess vehicles or move illegally parked vehicles. Most have controls for the apparatus inside the cab of the tow truck to make quick pickup possible without the loss of time to exit the truck to manually hook up the vehicle.

These are the most common arrangements, but are by no means exclusive; as there are flatbed units that offer a wheel-lift, boom trucks that can recover but not tow, and wheel-lift units that offer a combination boom with sling.

Flatbed carriers utilize a slide and tilt mechanism that is integrated into the trailer portion of a chassis frame of a truck. The flatbed is coined from a flat carrier body used to load and transport a vehicle. The system is operated via a series of hydraulic pistons. One hydraulic piston adjusts the position of the carrier body along a longitudinal axis of the vehicle. A second hydraulic piston rotates the carrier body between a loading angle and a transporting angle. The carrier body is a single, planar surface. The carrier body needs to be positioned into a transport configuration, wherein the carrier body is drawn forward, locking the body into position via a pair of locking pins or receptacle located on the trailer portion of the frame, proximate the cab. A wheel lift may also be integrated onto some flatbed carriers. The wheel lift is affixed to the flatbed carrier frame as an appendage thereof.

Flatbed or slideback carriers have been utilized for transporting vehicles since the late 1960's. Wheel lifts were developed for transporting vehicles in the 1980's. The wheel-lift was integrated into the slideback carrier and is dependent upon the carriers articulating support structure as its operative and structural support mechanism.

One shortcoming of the currently available configuration is the designs limitations. Each of the carrier body assemblies for creation of a flatbed vehicle transportation truck is limited in that the design is specific to the configuration of the receiving vehicles construction. The variety of donor vehicles and imposed conflicts between each of the wide range of different truck chassis frame configurations and safety standards in the market place limit the interchangeability between product designs. This directs the carrier body manufacturer to make available a series of designs for specific or potential donor vehicles. Additionally, the balance of the distribution chain is challenged to inventory and support many varieties of form factors to support the possible donor vehicles. A single design that is adaptable to any donor vehicle is desirable.

A second shortcoming of the currently available configuration is the need to reinforce or modify the structure of the donor truck's chassis frame prior to mounting a non-affixed articulating type of truck body similar to the flatbed carrier assembly. Structural modifications to the donor vehicle's chassis frame can impact the vehicle's warranty, any prior government design approvals, certifications, and the like. Significant considerations need to be made prior to making any structural changes to the donor vehicle. A carrier body assembly that avoids any modifications to the donor vehicle's chassis frame is desirable. A design that can be integrated onto light and medium duty trucks is desired.

A third shortcoming of the currently available carrier configuration is the requirement of a long carrier body length who's structural mass is abnormally overextended by design beyond the vehicle's rear axle and suspension members during over the road transport mode, in order to achieve a respectable loading angle when the distal end of the carrier body is in contact with the ground or load receiving surface, and is longer than required to support the overall wheel base of a vehicle such as an extended pick up truck or an oversized luxury car, such as a Rolls Royce, during transport. Normally, the carrier body is required to be positioned fully retracted, thus engaging locking pins prior to transporting any vehicles. This configuration is considered overkill for the majority of smaller or medium cars and vans. These longer towing vehicles with an extended rear overhang are disproportionally balanced, are less stable, and are heavier, thus resulting in higher fuel costs. These longer towing vehicles are also less maneuverable than shorter vehicles, particularly in tight areas such as cities. A carrier body assembly that can be integrated onto a donor vehicle with a shorter overall dimension is desirable.

Cargo, such as a vehicle, vehicle parts, and the like, placed on the platform must be secured in position for transport. If the cargo were to become dislodged, the cargo can move about the carrier and potentially become damaged or worse, the cargo fall off the carrier platform and injure another person or group of people and damage other property. A cargo platform for a flatbed carrier having features for aiding in securing cargo is desired.

SUMMARY OF THE INVENTION

The basic inventive concept for a flatbed vehicle carrier.

A first aspect of the present invention provides a flatbed carrier assembly comprising:
- a chassis mounting platform assembly;
- a carrier body subassembly comprising a carrier floor supported by a carrier body;
- a slide enabling sill frame being integrated into the carrier body;
- a carrier body intermediate subframe with a plurality of longitudinally arranged slide provisions provided in a parallel arrangement;
- a carrier tilt and longitudinal control inner pivotal subassembly being slideably assembled to the carrier body intermediate subframe and pivotally assembled to the chassis mounting platform;
- a carrier pivot control device extending between the carrier body intermediate subframe and the chassis mounting platform assembly;
- a carrier body longitudinal actuator member to slideably position the carrier body subassembly along a longitudinal axis of the carrier body subassembly, the carrier body longitudinal actuator member having a first end attached to the carrier intermediate subframe and a second end attached to the carrier body subassembly; and
- a carrier tilt and longitudinal control inner subframe motion actuator having a first end attached to the carrier tilt and longitudinal control inner pivotal subassembly and a second end attached to the carrier intermediate subframe subassembly,
- wherein the carrier tilt and longitudinal control inner subframe motion actuator slideably positions the carrier intermediate subframe subassembly parallel to the longitudinal axis of the carrier body subassembly, wherein the sliding motion works on conjunction with the carrier pivot control device to generate a pivotal motion of the carrier intermediate subframe subassembly.

A second aspect of the present invention integrates a series of extrusions to form the carrier body.

In another aspect of the present invention, the carrier body further comprises a pivotal ramp assembly located adjacent to a loading end of the carrier body.

In another aspect, the pivotal ramp assembly is fabricated via a series of integrated extrusions. The extrusions utilized are preferably the same as those provided for the carrier body.

In another aspect, the pivotal ramp assembly is operated via a rotating cam assembly.

In another aspect, the pivotal ramp assembly is operated via a motive driven cable chain drive assembly.

In another aspect, the pivotal ramp assembly is operated via a hydraulic assembly.

In another aspect, the carrier drive mechanism is a hydraulic assembly.

In another aspect, the carrier pivotal control motion actuator is a hydraulic assembly.

In another aspect, a wheel lift subassembly is attached to and able to slide within the chassis mounting platform assembly.

In another aspect, the wheel lift comprises a lateral extension mechanism and a pivot control mechanism.

In another aspect, the flatbed carrier assembly is complete and independent of a vehicle trailer frame, wherein the flatbed carrier assembly can be adapted to any reasonable vehicle trailer frame.

Another key feature of the present invention introduces a flatbed carrier assembly comprising an edge rail comprising a strap latching element receiving feature.

In another aspect, the hook receiving edge rail is formed having at least one of an upper hook receptacle and a lower hook receptacle.

In yet another aspect, the hook receiving edge rail is formed as an extrusion, wherein the at least one of the upper hook receptacle and the lower hook receptacle are formed having a constant shape extending along a length of the hook receiving edge rail.

In another aspect, the hook receiving edge rail is assembled to at least one edge of a flatbed carrier platform.

In yet another aspect, one hook receiving edge rail is assembled to each edge of the flatbed carrier platform.

In yet another aspect, a sliding latching element is slideably assembled to a latching element receiving channel formed within the hook receiving edge rail.

In yet another aspect, the sliding latching element receiving channel is formed including at least one of the upper hook receptacle and the lower hook receptacle.

In yet another aspect, the sliding latching element receiving channel is formed including both the upper hook receptacle and the lower hook receptacle.

In yet another aspect, the sliding latching element is an assembly comprising a latching base element and a pivotal latching element pivotally assembled to the latching base element.

In yet another aspect, the latching base element comprises a latching base element and a pivotal latching element pivotally assembled to the latching base element.

In yet another aspect, the sliding latching element includes a strap receiving slot.

In yet another aspect, the pivotal latching element includes a strap receiving slot.

Details of these and additional aspects of the present invention are presented in the detailed description of the drawings presented below.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
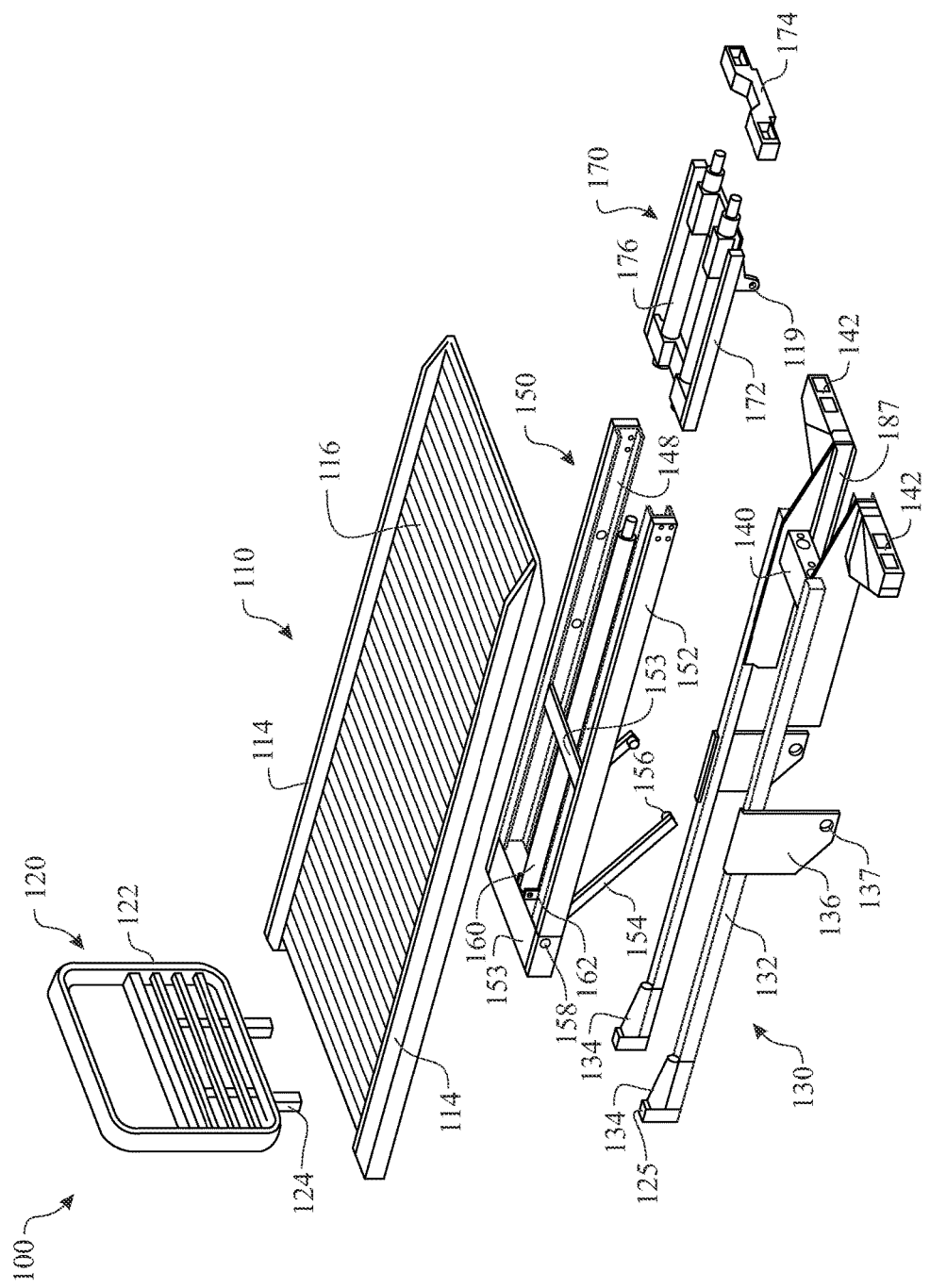
FIG. 1 presents a top isometric exploded assembly view of the basic elements of a flatbed carrier and mounting platform assembly.
Figure 2:
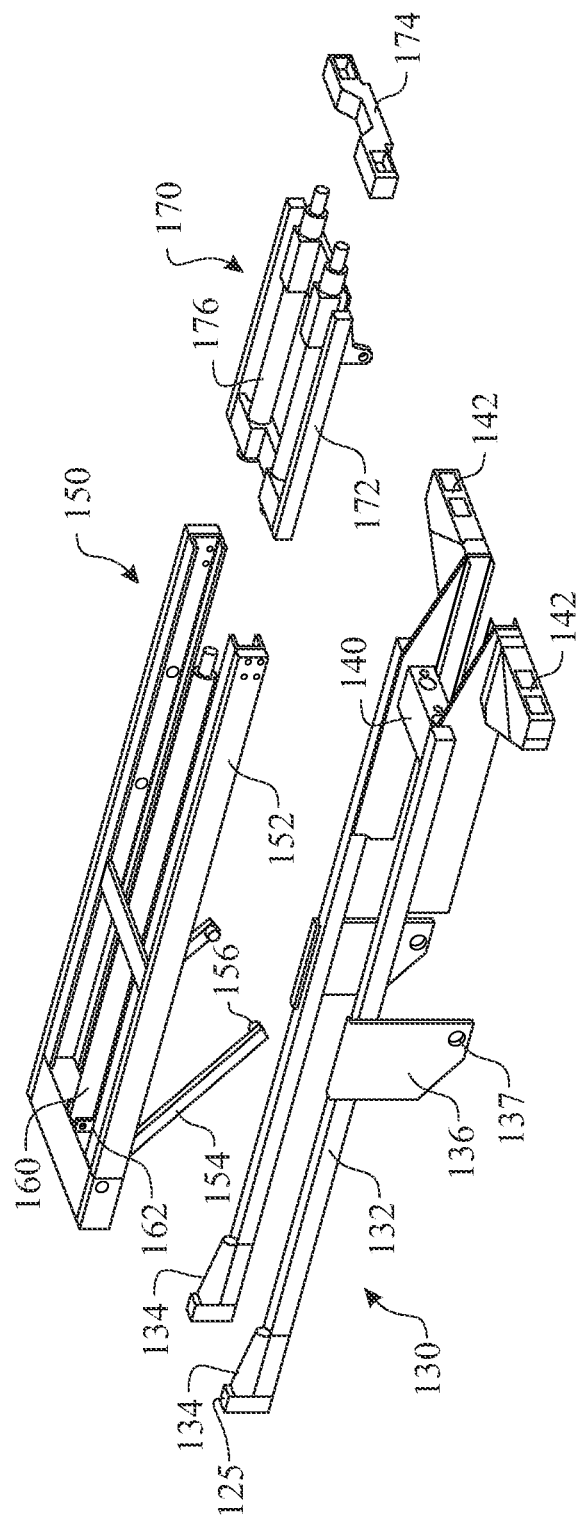
FIG. 2 presents a top isometric exploded assembly view of the operative elements of the flatbed carrier and mounting platform assembly of FIG. 1.
Figure 3:
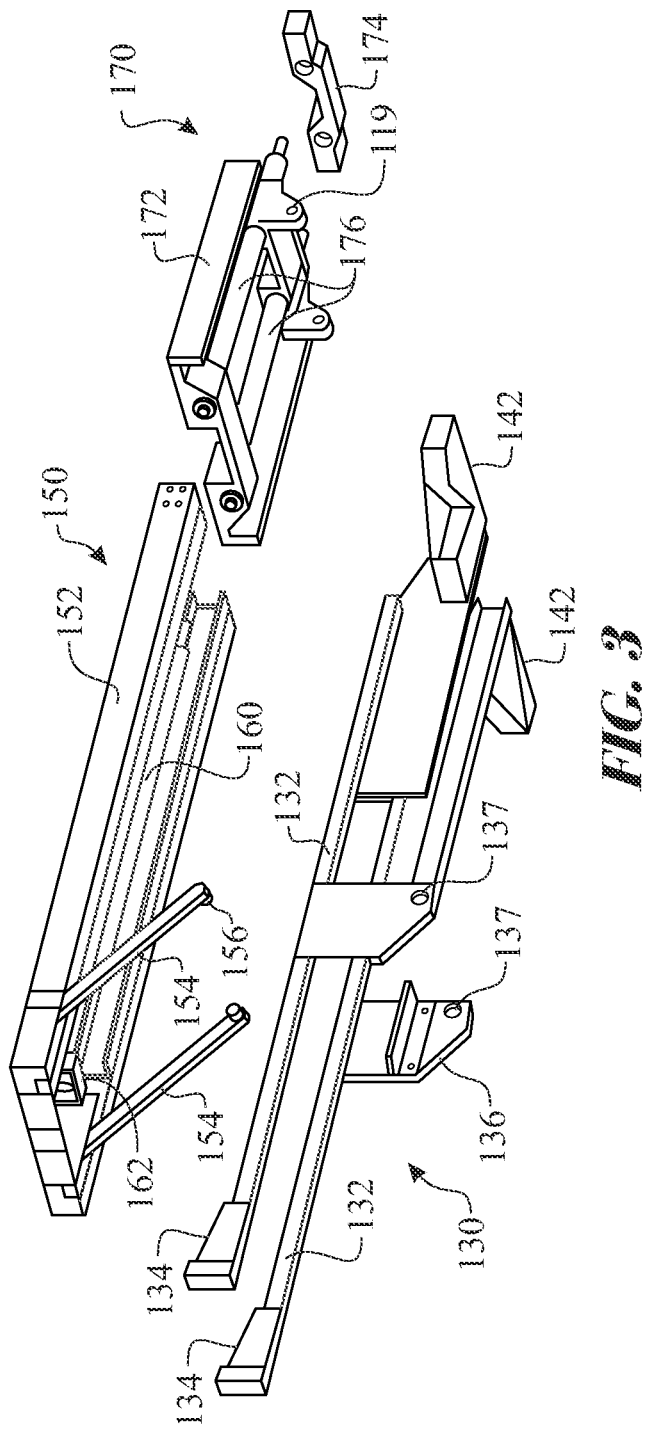
FIG. 3 a bottom isometric exploded assembly view of the operative elements of the flatbed carrier and mounting platform assembly of FIG. 1.
Figure 4:
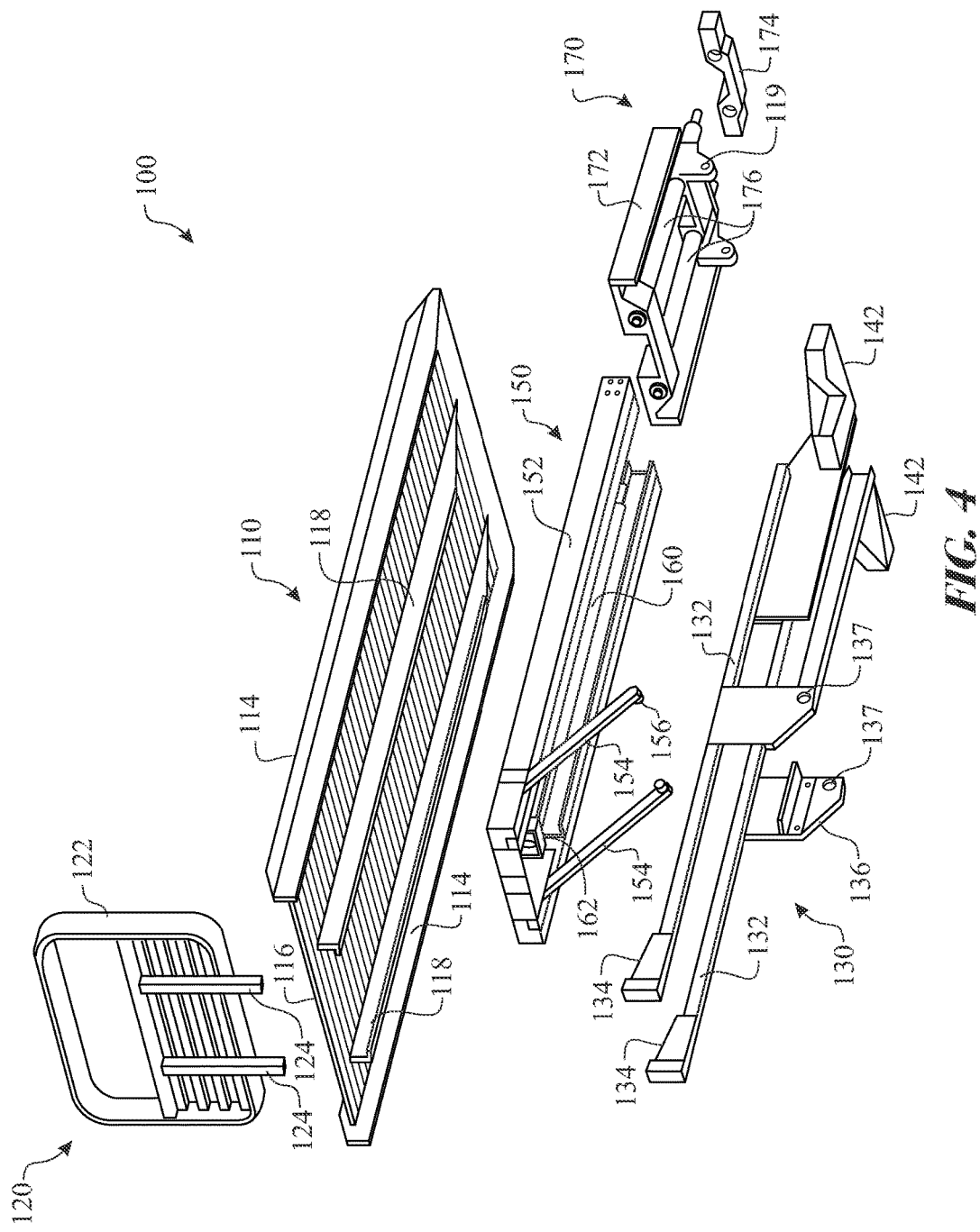
FIG. 4 presents a bottom isometric exploded assembly view of the basic elements of the flatbed carrier and mounting platform assembly of FIG. 1.
Figure 5:
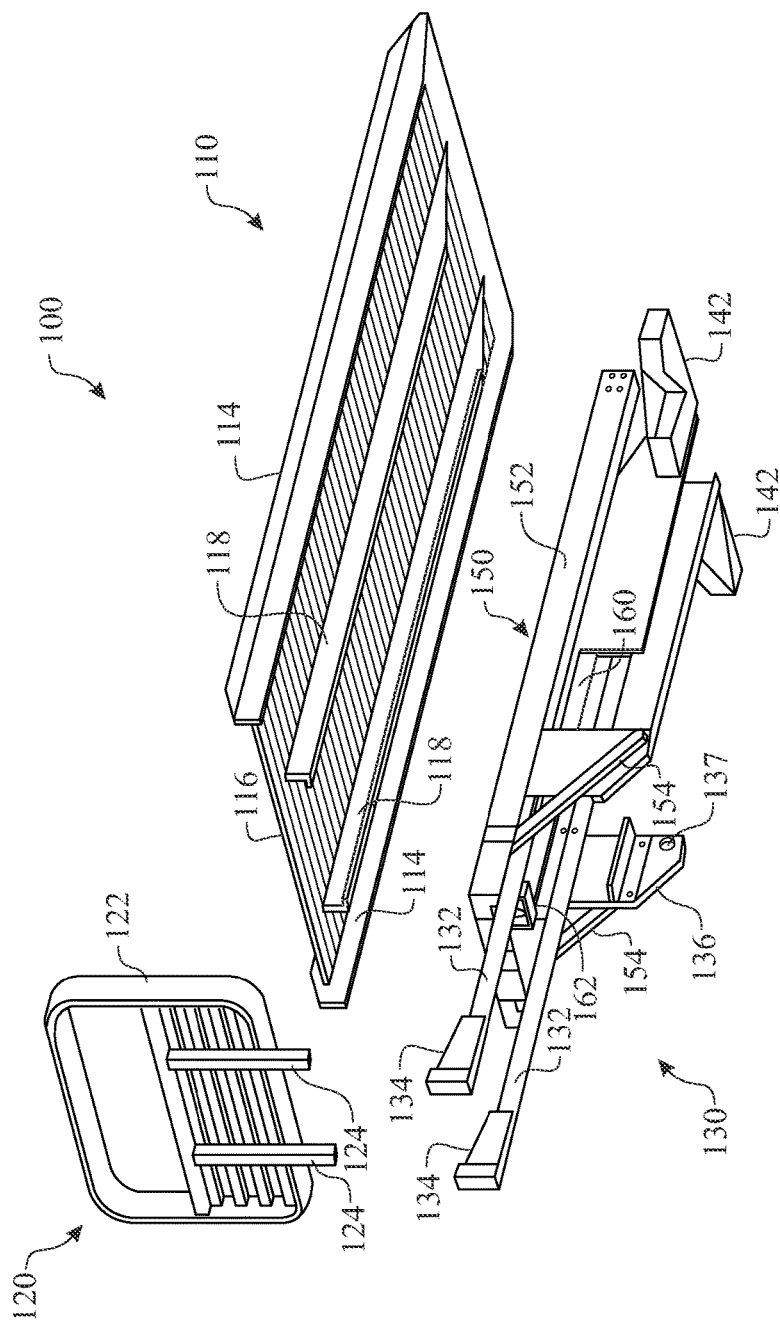
FIG. 5 presents a bottom isometric partially assembled view of the flatbed carrier, the intermediate subassembly, and the mounting platform assembly of FIG. 1.
Figure 6:
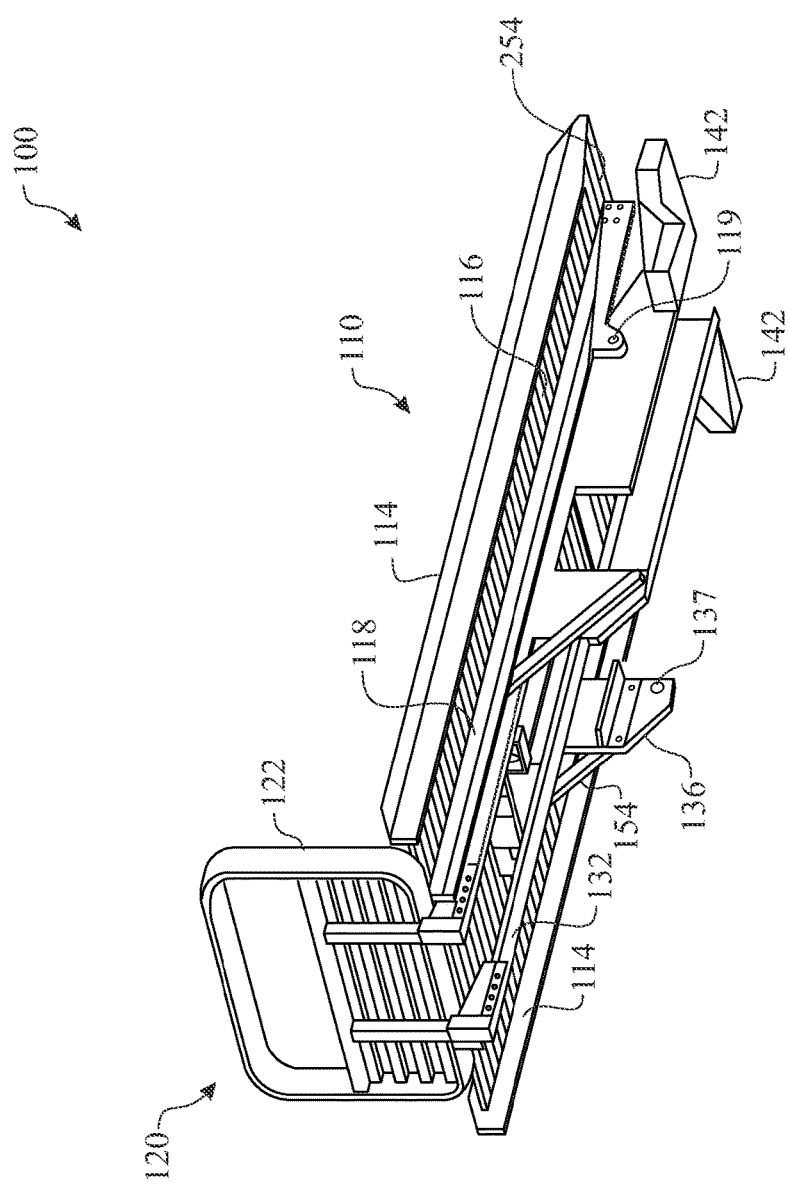
FIG. 6 presents a bottom isometric fully assembled view of the flatbed carrier assembly and the intermediate subassembly integrated upon the mounting platform assembly of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 16:
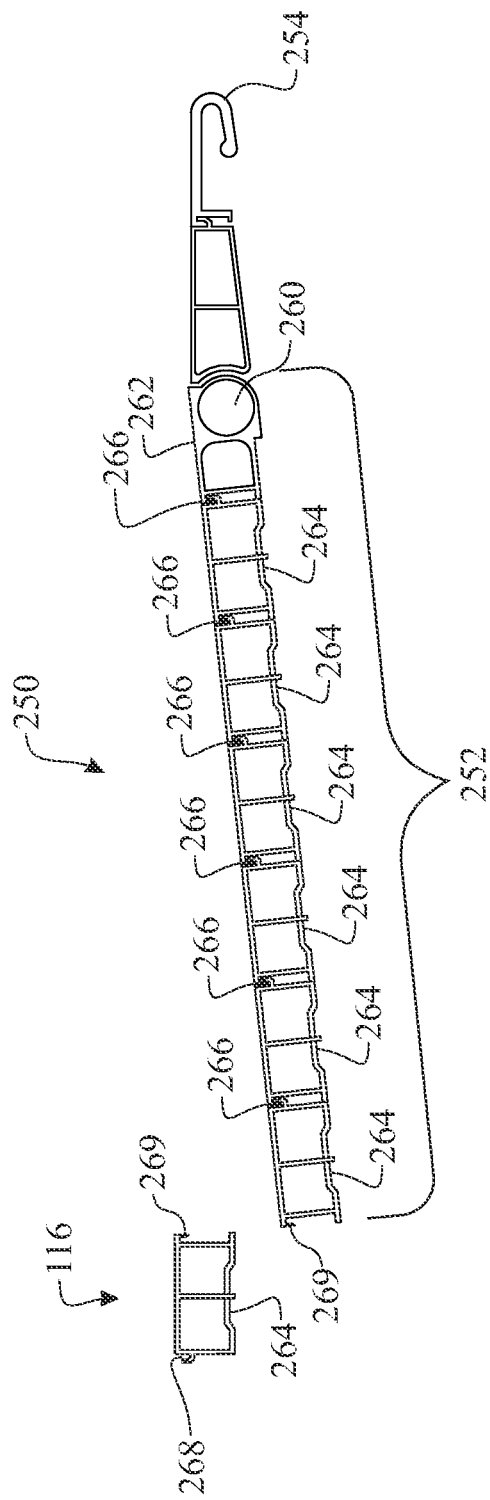
FIG. 16 presents a sectional side view of the pivotal ramp assembly detailing a series of integrated extrusions.
Figure 17:
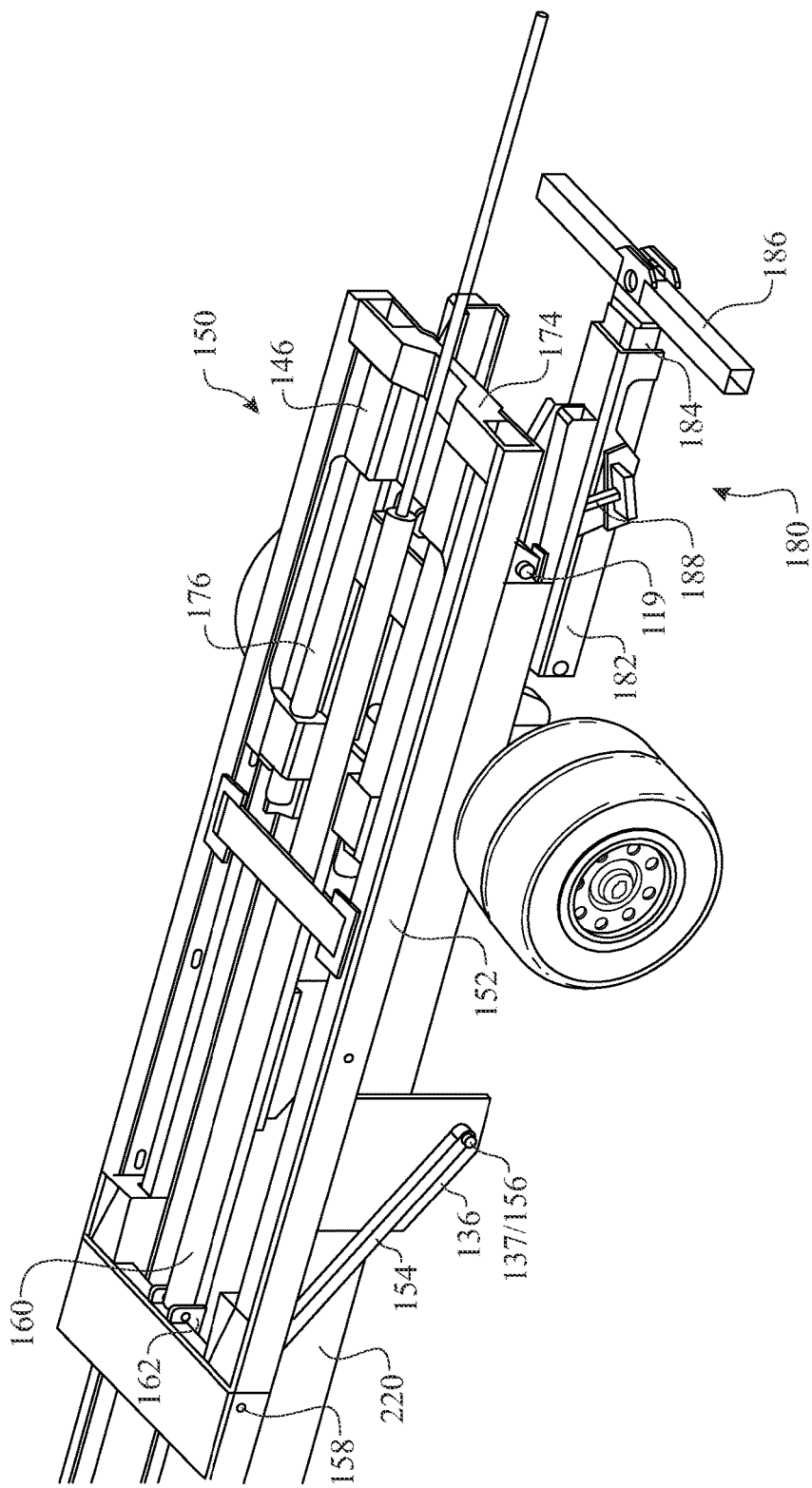
FIG. 17 presents an isometric view of the operable mechanisms of the flatbed carrier assemblies and wheel lift subassembly integrated onto the carrier vehicle chassis.
Figure 18:
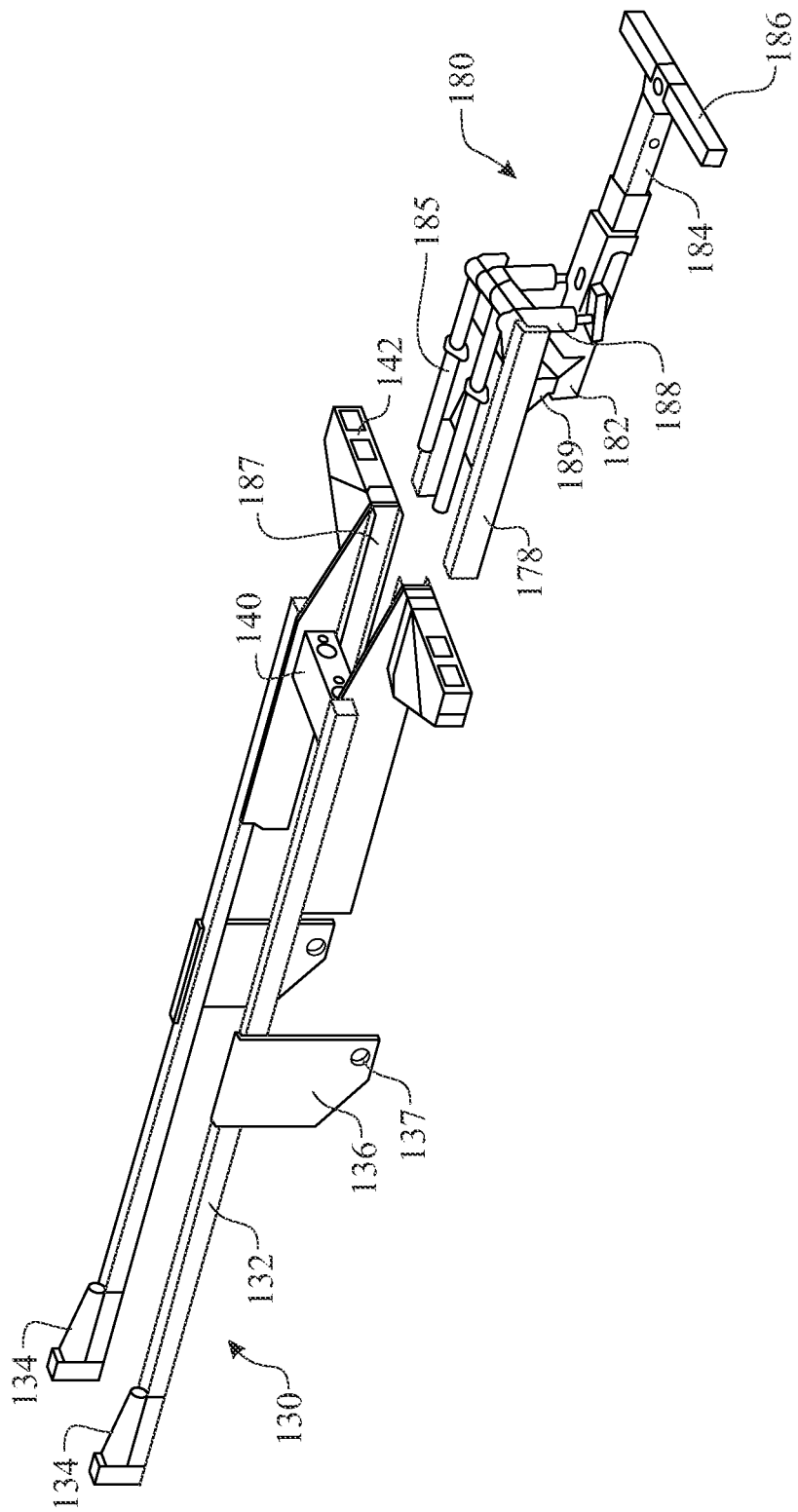
FIG. 18 presents a top isometric exploded assembly view of the chassis mounting platform assembly and wheel lift subassembly.
Figure 19:
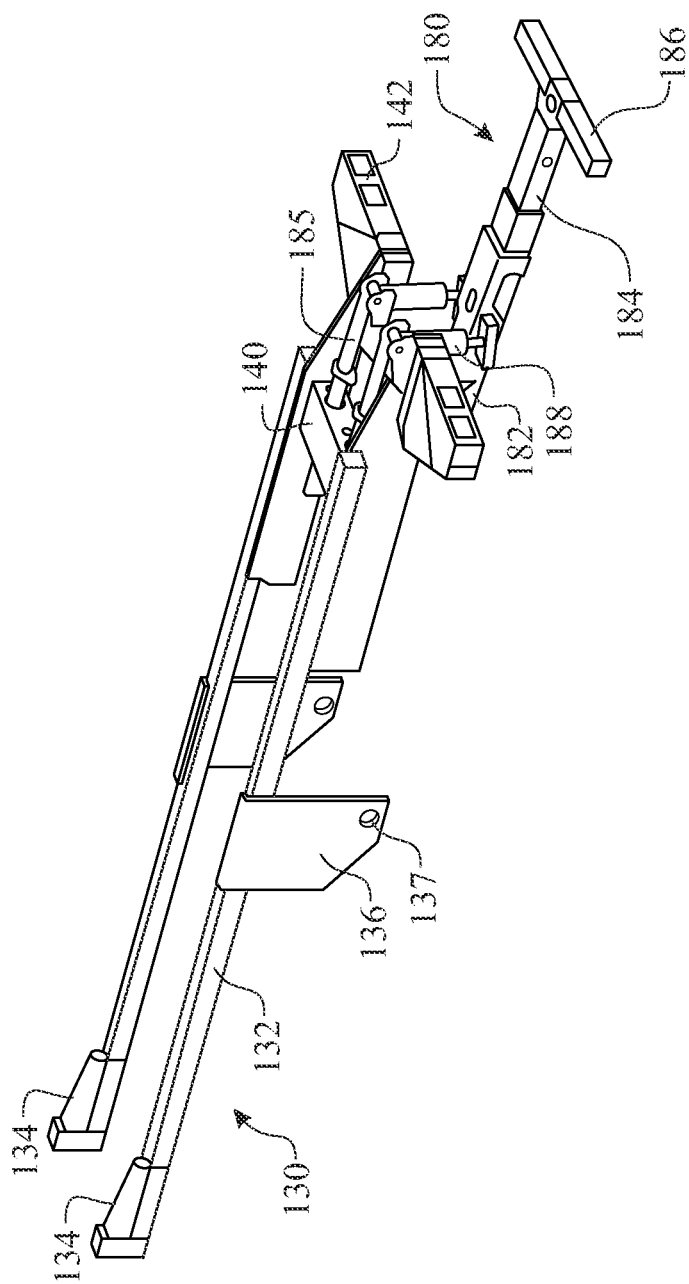
FIG. 19 presents a top isometric view of the wheel lift subassembly assembled into the chassis mounting platform.
Figure 20:
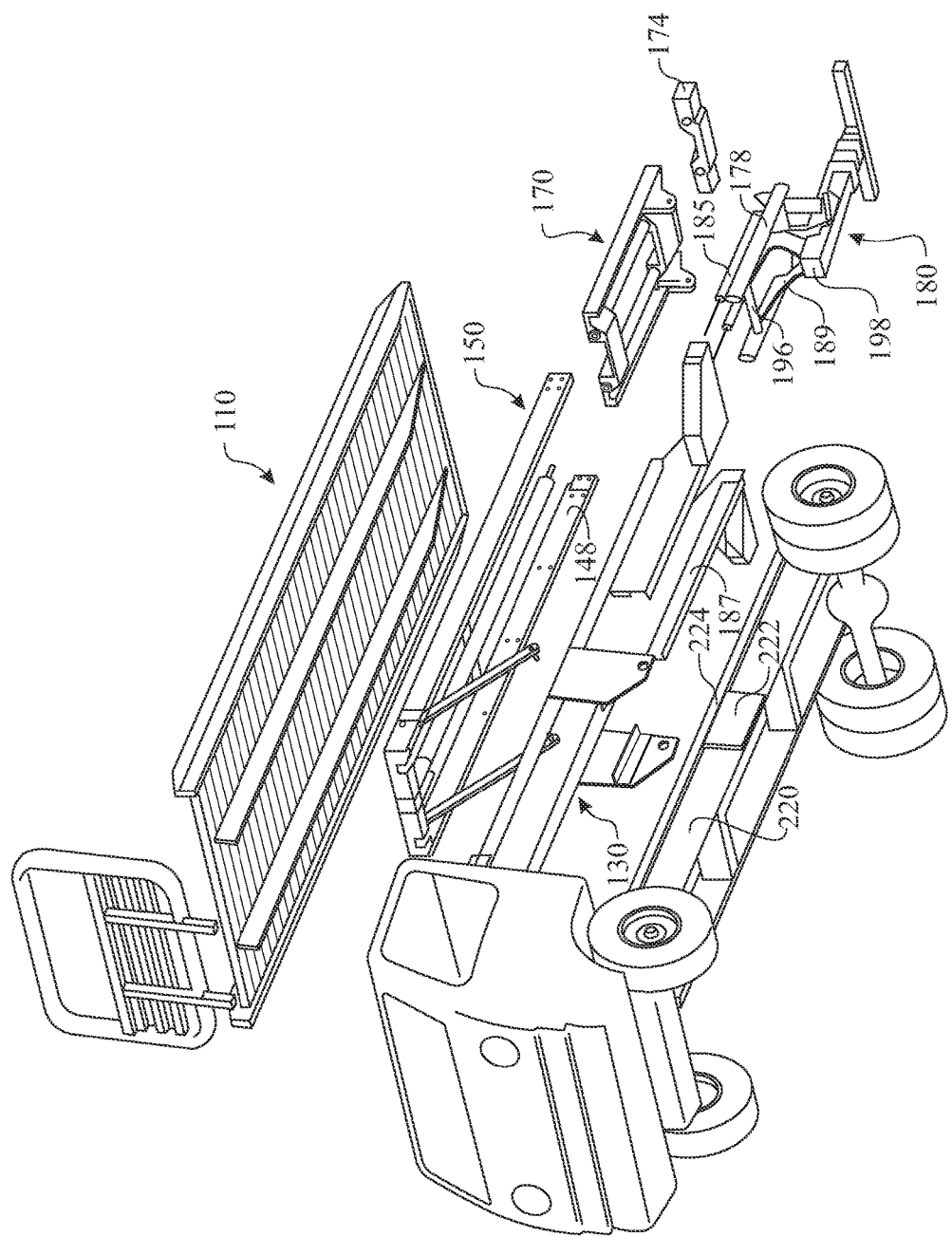
FIG. 20 presents a bottom isometric exploded assembly view of the flatbed carrier assemblies, the wheel lift assembly, the mounting platform assembly, and the carrier vehicle.
Figure 21:
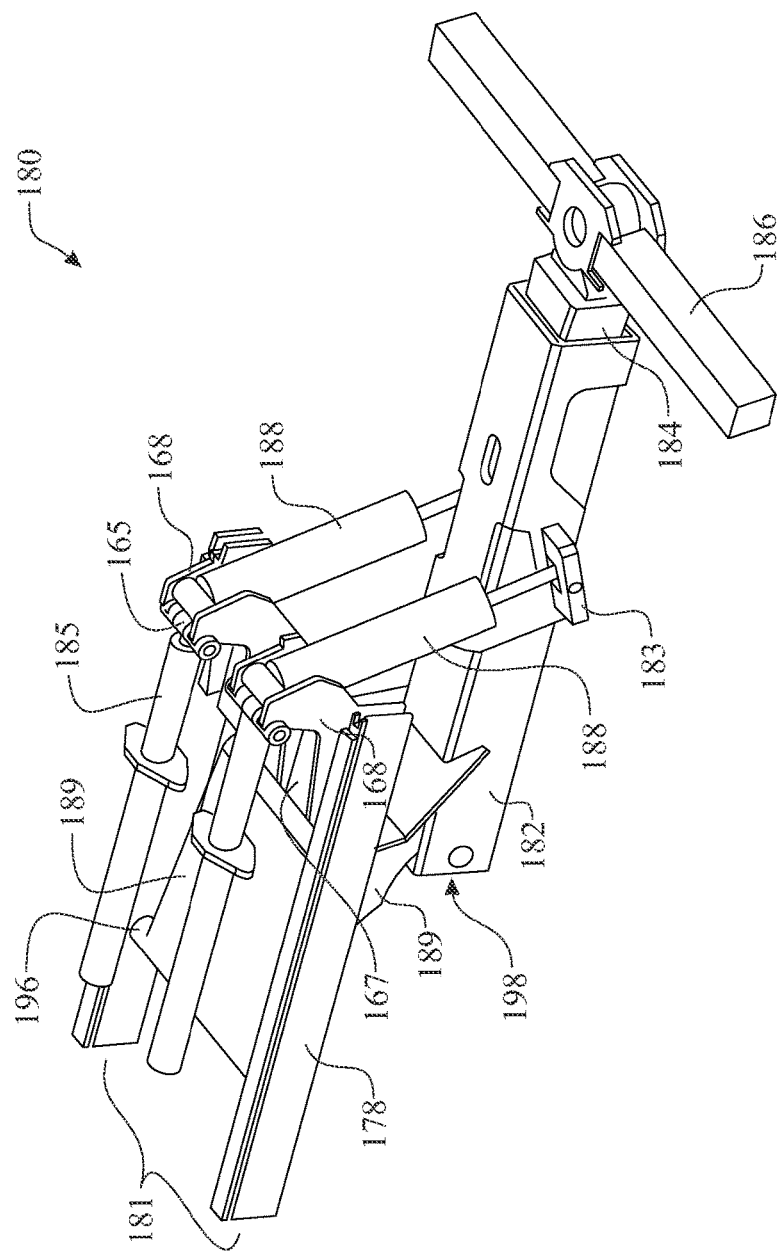
FIG. 21 presents a top isometric view of the independent wheel lift assembly.

A carrier assembly 100 is presented in FIGS. 1 through 6. The carrier assembly 100 comprises several subassemblies, including a carrier body subassembly 110, a chassis mounting platform assembly 130, a carrier intermediate subframe subassembly 150 and a carrier tilt and longitudinal control inner pivotal subassembly 170. The carrier body subassembly 110 is fabricated having a carrier body floor assembly 116 spanning between a pair of longitudinally arranged carrier body edge rails 114. The carrier body floor assembly 116 is fabricated of a plurality of extrusions, which will be detailed in FIG. 16. The carrier body floor assembly 116 is supported via a carrier body slide enabling sill frame. The carrier body slide enabling sill frame comprises a pair of carrier body sill frame channels 118 disposed upon an underside of the carrier body floor assembly 116. The carrier body sill frame channels 118 are preferably fabricated of a pair of "C" or "L" shaped channels attached to the carrier body subassembly 110 along a longitudinal axis of the carrier body subassembly 110. The carrier body sill frame channels 118 are spaced to ride along the outer edges of the carrier intermediate subframe subassembly 150.

Figure 7:
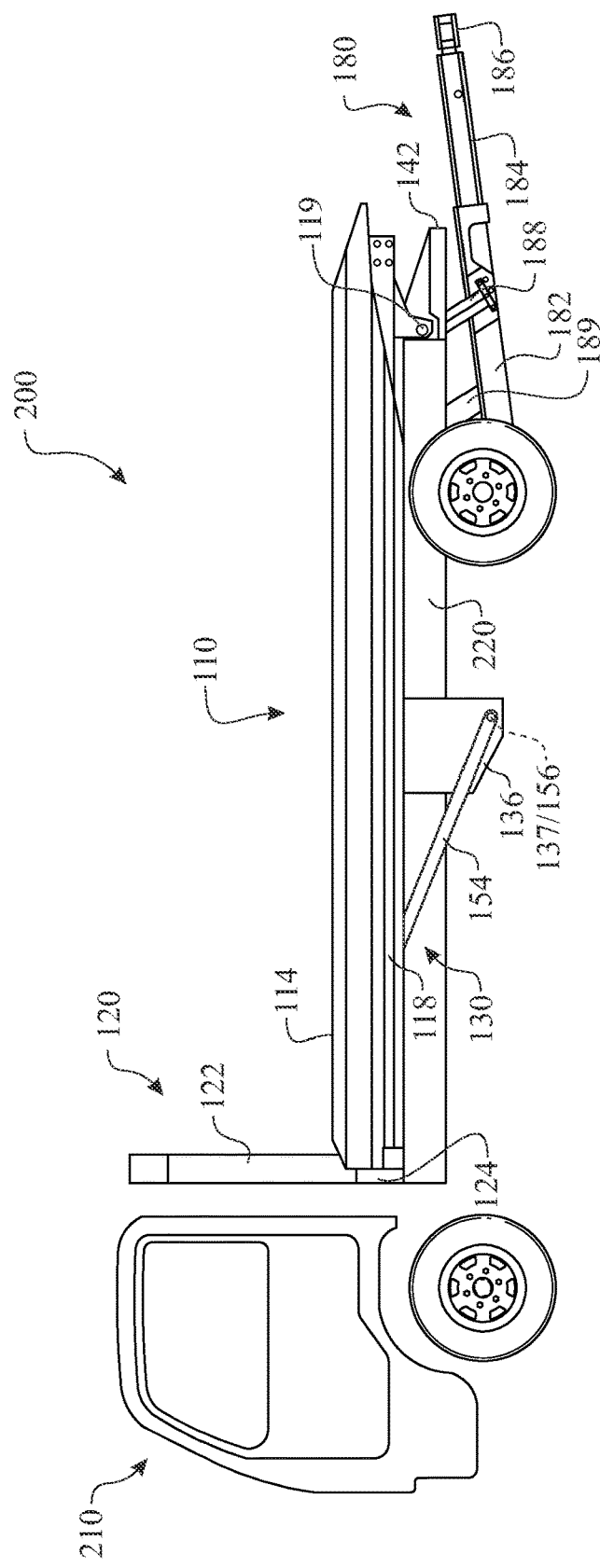
FIG. 7 presents an elevation view of a carrying vehicle having a flatbed carrier assembly integrated thereon and introducing a wheel lift subassembly.

The chassis mounting platform assembly 130 is fabricated having a pair of mounting platform rail and chassis reinforcement members 132 designed to be directly or indirectly attached to a vehicle frame (220 of FIG. 7). A headboard socket 125 and reinforced mounting platform attachment device 134 is integrated at a cab end of each mounting platform rail and chassis reinforcement member 132. The headboard socket 125 and reinforced mounting platform attachment device 134 reinforces the attachment and rigidity of the mounting platform rail and chassis reinforcement member 132. An independent wheel lift subassembly support cross member 140 is provided at a lift end of the chassis mounting platform assembly 130. A similar cross member (not shown) can be assembled to the chassis mounting platform assembly 130, spanning between the cab ends of the pair of mounting platform rail and chassis reinforcement members 132. The cross members also provide stiffness to the chassis mounting platform assembly 130, as well as an additional regions for mounting the chassis mounting platform assembly 130 to the vehicle frame or mounting of other subassemblies. A pivot control plate 136 is disposed upon each of the mounting platform rail and chassis reinforcement members 132. The pivot control plates 136 extend downward providing a reasonable pivot location for a carrier pivotal control device 154. A mounting platform pivot mating interface 137 of the pivot control plate 136 is provided for receiving a carrier pivot mating interface 156 disposed at a first end of the carrier pivotal control device 154. It is understood the mounting platform pivot mating interface 137 can be of any form factor and provided at any reasonable location to achieve the desired mechanics of the system. A pair of integrated wheel lift fore/aft slide channels 187 is provided for receiving a wheel lift subassembly (180 of FIG. 7). A pair of taillight subassemblies 142 can be integrated at the loading end of the chassis mounting platform assembly 130. It is understood that tail light subassembly 142 can be assembled to the loading end of the chassis mounting platform assembly 130 (as illustrated), the carrier body subassembly 110, or any other reasonable rearward location.

The carrier intermediate subframe subassembly 150 is fabricated of a pair of carrier intermediate subframe rails 152 disposed in a parallel arrangement. A carrier tilt and longitudinal control inner subframe slide channel 148 is attached to the interior side of each of the carrier intermediate subframe rails 152 for slideably receiving the carrier tilt and longitudinal control inner pivotal subframe 172. At least one carrier intermediate subframe cross member 153 is assembled attaching the carrier intermediate subframe rails 152 in order to maintain the carrier intermediate subframe rails 152 in a parallel arrangement. The carrier pivotal control device 154 is pivotally attached to the carrier intermediate subframe subassembly 150 at a carrier second pivot interface 158, wherein the pivot location is located proximate the cab end of the carrier intermediate subframe subassembly 150. A carrier body longitudinal actuator member 160 is provided having a first end attached to the cab end of the carrier intermediate subframe subassembly 150 via a carrier body actuator mounting and pivot bracket 162, as illustrated or by other means. A second end of the carrier body longitudinal actuator member 160 is attached to the carrier body subassembly 110. The carrier intermediate subframe rails 152 preferably include a "C" channel attached along an interior surface, the "C" channels being referred to as a carrier tilt and longitudinal control inner subframe slide channel 148 as illustrated for slideably receiving the carrier tilt and longitudinal control inner pivotal subassembly 170. Bearing strips would be provided between the sliding interfaces, including between the carrier body sill frame channels 118 and carrier tilt and longitudinal control inner subframe slide channels 148 as well as between other sliding interfaces.

The carrier tilt and longitudinal control inner pivotal subassembly 170 is fabricated having an inner pivotal tilt and longitudinal control motion actuator 176 having a first end attached to a feature of the carrier tilt and longitudinal control inner pivotal subassembly 170. A second end of the inner pivotal tilt and longitudinal control motion actuator 176 is attached to a carrier intermediate subframe rear cross member 174. The carrier intermediate subframe rear cross member 174 is secured to the loading end of the carrier intermediate subframe subassembly 150. A carrier tilt and longitudinal control inner subframe pivot 119 is provided, preferably located proximate a loading end of the carrier tilt and longitudinal control inner pivotal subassembly 170. The carrier tilt and longitudinal control inner subframe pivot 119 is assembled to a mating member disposed upon a rear portion of the chassis mounting platform assembly 130, providing a means for the carrier tilt and longitudinal control inner pivotal subassembly 170, and respectively the carrier intermediate subframe subassembly 150 to travel and pivot there about.

The carrier tilt and longitudinal control inner subassembly 170 slideably engages with carrier intermediate subframe subassembly 150. In the preferred embodiment, the carrier tilt and longitudinal control inner pivotal subframe 172 is slideably inserted between the pair of inner subframe fore/aft slide channels 148, with bearing strips provided therebetween. The carrier tilt and longitudinal control inner pivotal subassembly 170 pivotally engages with the chassis mounting platform assembly 130 proximate the loading end of the chassis mounting platform assembly 130 via the carrier tilt and longitudinal control inner subframe pivot 119.

Figure 8:
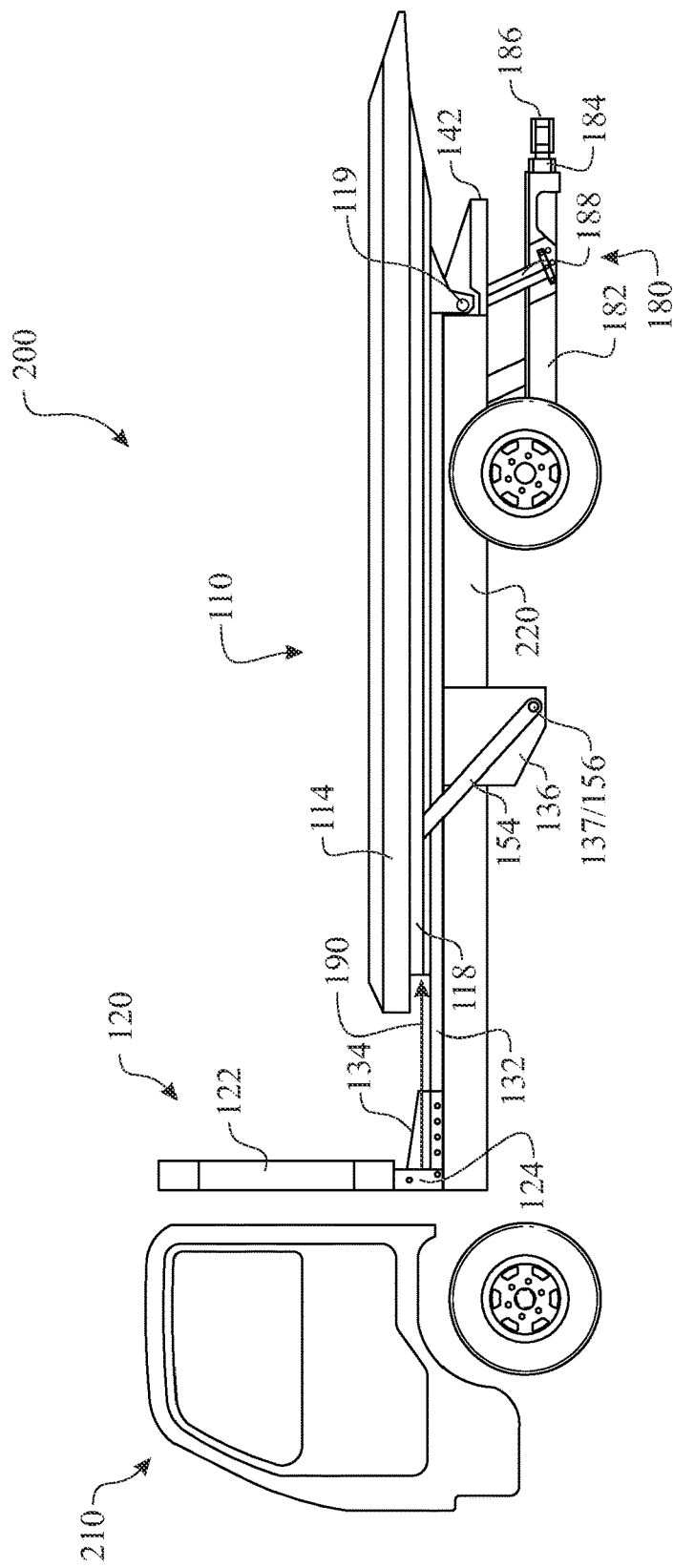
FIG. 8 presents an elevation view of the carrier vehicle illustrating a longitudinal motion of the carrier body.

An optional, but preferred cab protector cage assembly 120 is assembled to a cab end of the chassis mounting platform assembly 130, providing a barrier between objects placed onto the carrier body subassembly 110 and a vehicle cab (210 of FIG. 8). The cab protector cage assembly 120 comprises a cab protector frame 122 having a series of horizontal and vertical dividing members within the interior defined by the cab protector frame 122. A pair of cab protector mounting interface 124 extends downward from the cab protector frame 122 for attaching the cab protector cage assembly 120 to the chassis mounting platform assembly 130. A cab protector mount receiver 125 can be provided at the cab end of each of the mounting platform rail and chassis reinforcement member 132 for receiving a cab protector mounting interface 124. This interchangeable interface allows the installer to insert a cab protector cage assembly 120 designed specifically to compliment the size and shape of the cab 210 of the donor vehicle. This provides for a variety of alternate components the installer selects to inventory.

The carrier operates in accordance with the following motions:

Operation of the carrier body longitudinal actuator member 160 slides the carrier body subassembly 110 forward and aft, tracking along the carrier body sill frame channel 118 to carrier intermediate subframe rail 152 interface. In the illustrated exemplary embodiment, extending the carrier body longitudinal actuator member 160 moves the carrier body subassembly 110 rearward. Contracting the carrier body longitudinal actuator member 160 moves the carrier body subassembly 110 forward. Operation of the inner pivotal tilt and longitudinal control motion actuator 176 causes the carrier intermediate subframe subassembly 150 to exert a force upon the carrier second pivot interface 158, the force being applied towards the mounting platform pivot mating interface 137. The carrier tilt and longitudinal control inner pivotal subassembly 170 tracks within the carrier tilt and longitudinal control inner subframe slide channels 148 to carrier tilt and longitudinal control inner pivotal subframe 172 interface. The carrier pivotal control device 154 provides a carrier pivotal control which causes the carrier intermediate subframe subassembly 150 to pivot up, over, and rearward while sliding along the carrier tilt and longitudinal control inner pivotal subassembly 170 and pivoting about the carrier tilt and longitudinal control inner subframe pivot 119. In the preferred embodiment, the carrier pivotal control device 154 is a fixed beam. It is understood that the carrier pivotal control device 154 can be mechanically or otherwise adjustable.

Figure 9:
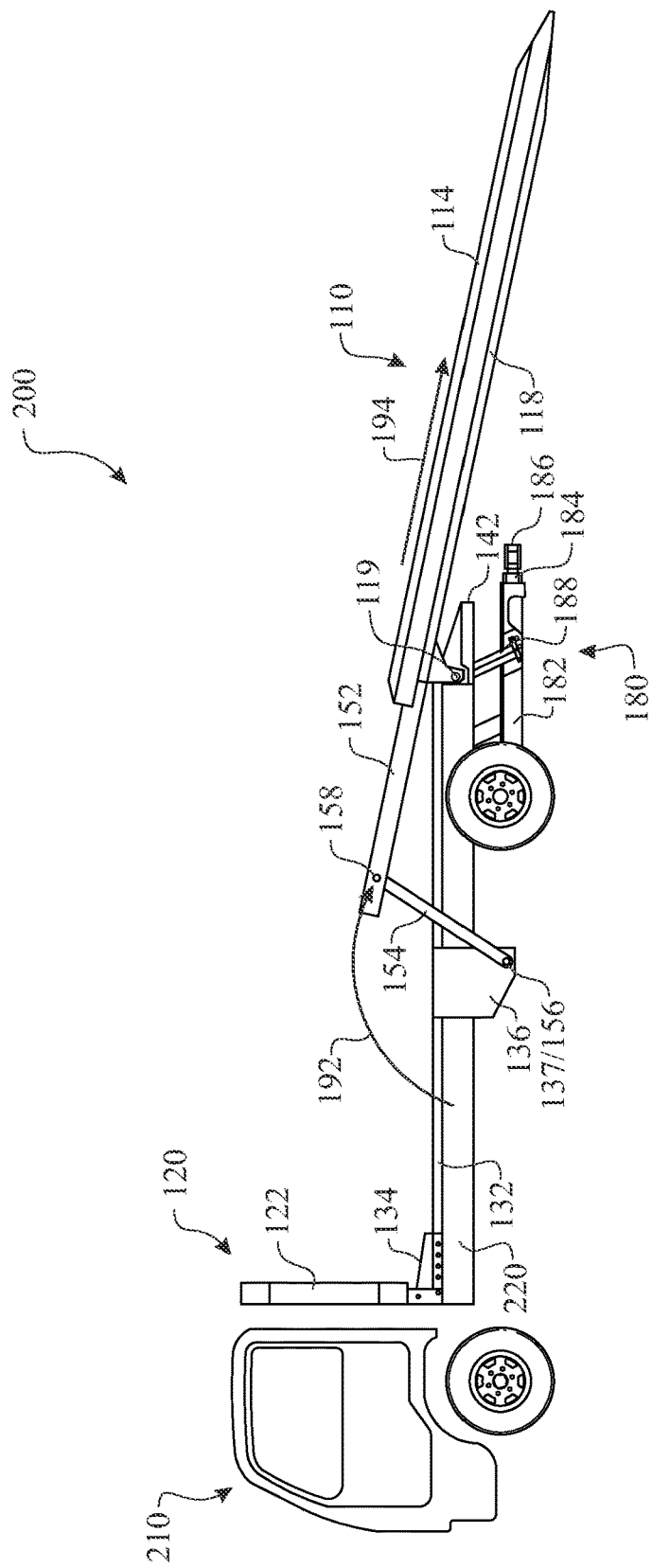
FIG. 9 presents an elevation view of the carrier vehicle illustrating a rearward transfer and pivotal motion of the assembled carrier body, and assemblies.

An exemplary carrier vehicle 200 having a carrier assembly 100 integrated thereon is illustrated in FIGS. 7 through 9. The carrier vehicle 200 includes a cab 210 assembled upon a vehicle frame 220. Although not identified, the carrier vehicle 200 additionally includes commonly known components such as wheels and tires, an engine and drive train, suspension, steering components, and the like. The chassis mounting platform assembly 130 is assembled to the vehicle frame 220.

An independent wheel lift subassembly 180 is slideably assembled within the wheel lift fore/aft slide channels 187 interface of the chassis mounting platform assembly 130, such to slide fore and aft. The independent wheel lift subassembly 180 comprises an independent wheel lift extendible inner boom 184 with an independent wheel lift extensible inner boom motive actuator 198 being slideably assembled within an independent wheel lift pivotal lifting boom assembly 182. An independent wheel lift rotational cross bar 186 is disposed upon a distal end of the independent wheel lift extendible inner boom 184. An independent wheel lift pivotal boom lifting actuator 188 is connected to wheel lift pivot actuator connecting bracket 168 having a first end which is affixed to wheel lift pivot actuator connecting bracket 168 mounted upon a wheel lift cross member 167 and second end attached to a pivot actuator boom bracket 183 which is assembled to the independent wheel lift pivotal lifting boom assembly 182. The fore/aft repositioning of the independent wheel lift between a retracted stored position and an extended towing position is accomplished by means of an independent wheel lift fore/aft motion actuator 185 having a first end attached to the independent wheel lift support cross member 140 and a second end attached to a wheel lift extension actuator assembly joint 165 of the wheel lift pivot actuator connecting bracket 168. The independent wheel lift pivotal lifting boom assembly 182 is pivotally attached to the independent wheel lift slide rail members 178 via a pivotal boom transverse support member 189 via independent wheel lift lifting boom trunion pivot 196.

Figure 10:
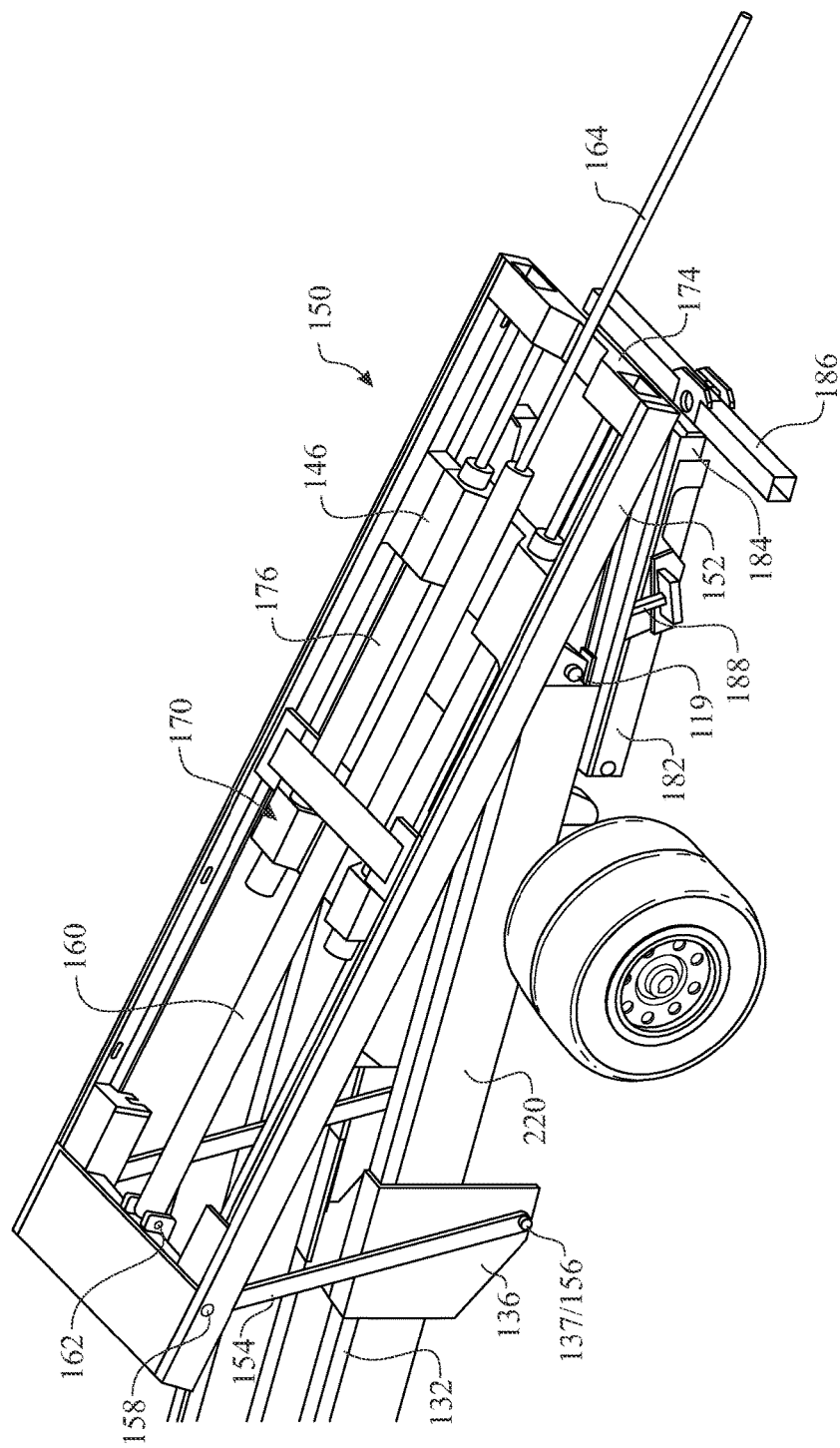
FIG. 10 presents an isometric view of the operating mechanisms of the flatbed carrier assembly illustrating an initial pivotal motion of the carrier body subassemblies.
Figure 11:
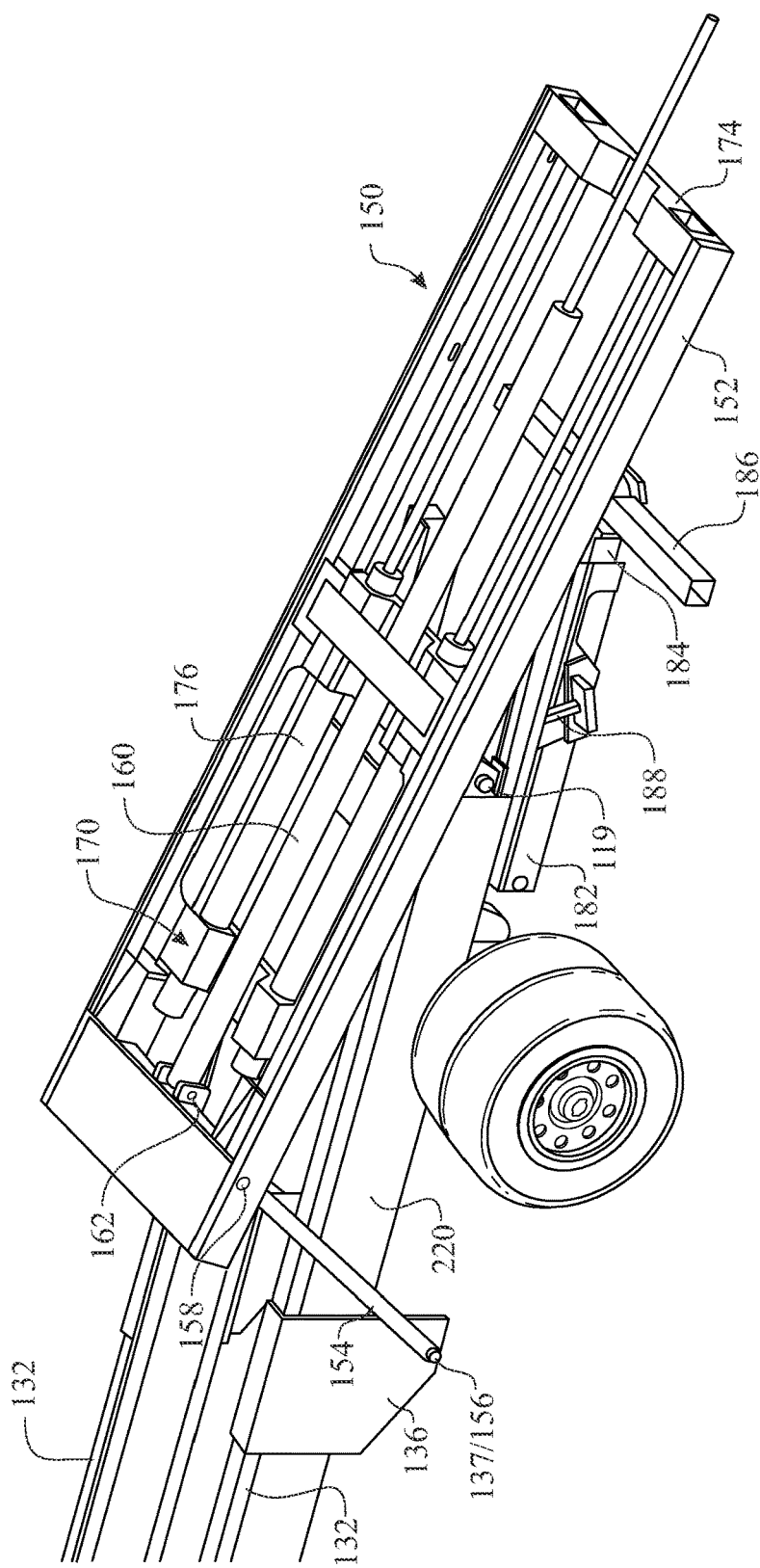
FIG. 11 presents an isometric view of the operating mechanisms of the flatbed carrier subassembly illustrating a continued and resultant rearward transfer and pivotal motion of the respective subassemblies.
Figure 12:
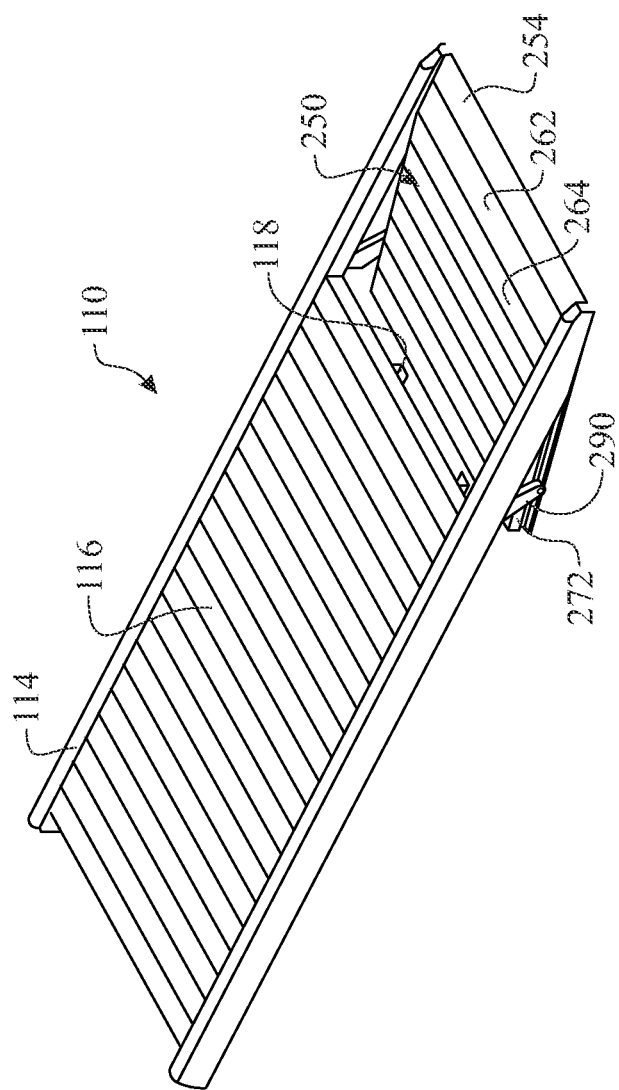
FIG. 12 presents an isometric view of a carrier body, introducing an integrated pivotal ramp assembly.
Figure 13:
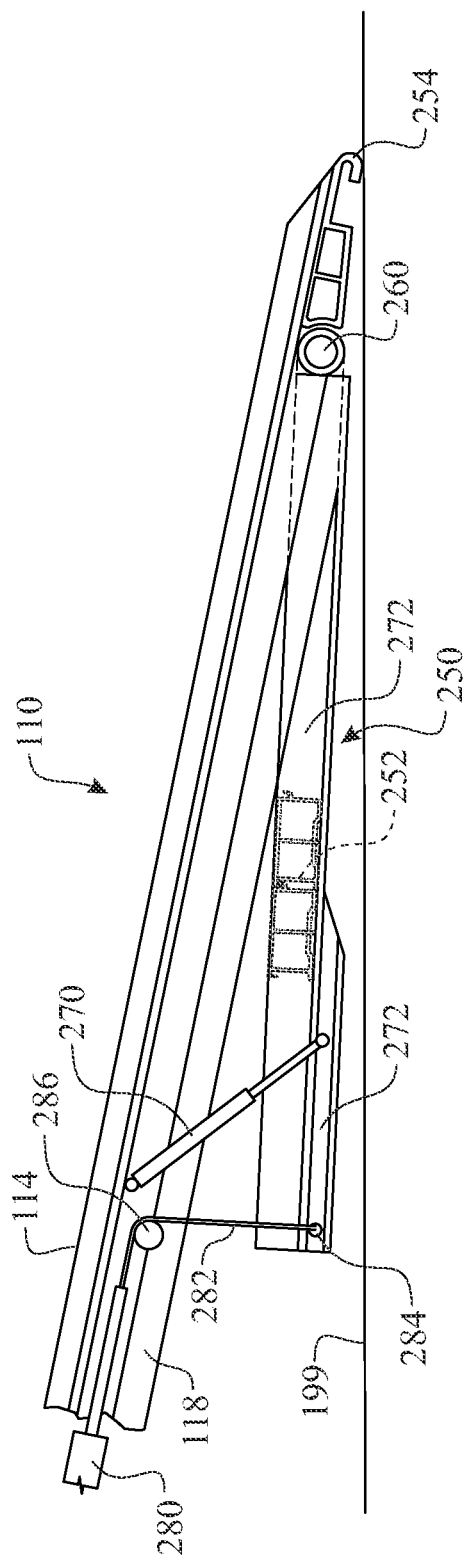
FIG. 13 presents a side elevation view of the pivotal ramp assembly of FIG. 12 operated via a cable chain drive assembly.
Figure 14:
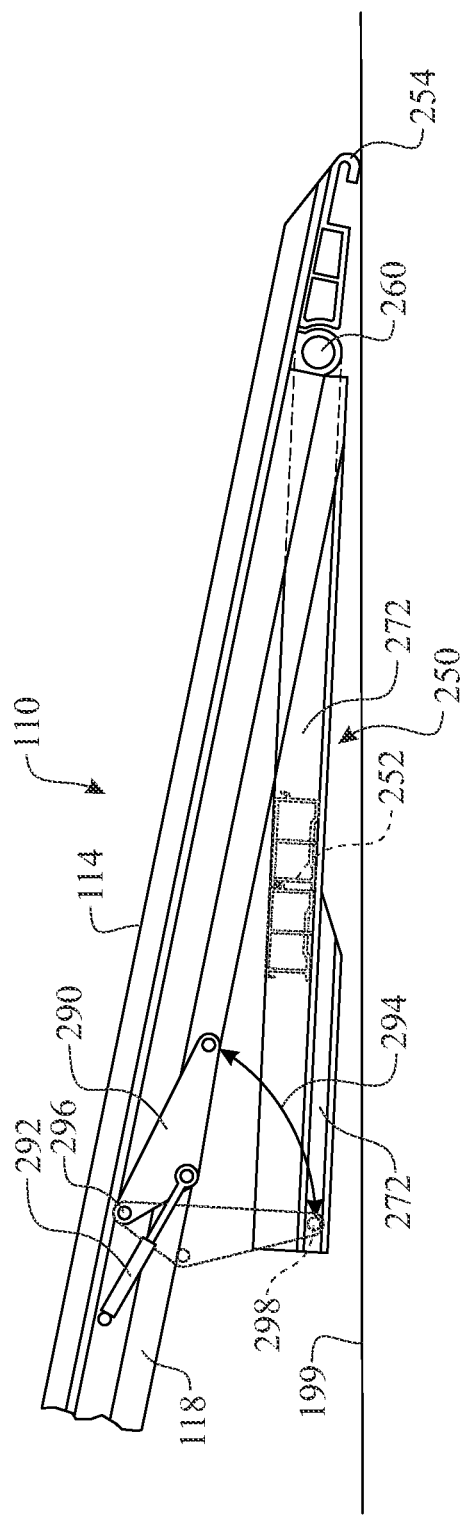
FIG. 14 presents a side elevation view of the pivotal ramp assembly of FIG. 12 operated via a cam assembly.

General operation of the carrier assembly 100 is illustrated in FIGS. 8 and 9. Respective details of the functional structures are exposed in FIGS. 10 and 11. The carrier body subassembly 110 slides aft in accordance with a rearward motion 190, as illustrated in FIG. 8. This motion is driven by the carrier body longitudinal actuator member 160. A motion actuator rod 164 extends and retracts from within a cylinder body of the carrier body longitudinal actuator member 160. The distal end of the motion actuator rod 164 is attached to the carrier body subassembly 110. The angle of the carrier body subassembly 110 is controlled via a rotation in accordance with a pivotal motion 192 (FIG. 9). The carrier intermediate subframe rail 152 is moved rearward via the inner pivotal tilt and longitudinal control motion actuator 176. As the carrier intermediate subframe rail 152 attempts to move rearward, a torque is generated against the carrier pivotal control device 154 causing the carrier intermediate subframe rail 152 to consequently travel up, over, and rearwardly while traveling via carrier tilt and longitudinal control inner pivotal subassembly 170 and pivoting about the carrier tilt and longitudinal control inner subframe pivot 119. The mounting platform pivot mating interface 137 must be positioned at a distance from the longitudinal axis of motion of the carrier intermediate subframe rail 152 in order to generate the necessary torque to pivot the carrier intermediate subframe rail 152. If the mounting platform pivot mating interface 137 were aligned with the longitudinal axis of motion of the carrier intermediate subframe rail 152, the subassembly would tend to bind upon attempted powered operation of the inner pivotal tilt and longitudinal control motion actuator 176. The carrier body subassembly 110 can be additionally adjusted along an incline until the loading end contacts the ground via a carrier body travel 194. The carrier body subassembly 110 moves along a sliding interface formed between the carrier body sill frame channel 118 and the carrier intermediate subframe rail 152. In this configuration, a vehicle may be driven upon the body, or alternately, winched thereon. A winch assembly may be affixed to the front or other portion of the carrier body subassembly 110.

A carrier body internal pivotal ramp subassembly 250 can be optionally integrated into the carrier body subassembly 110, as described by the exemplary illustrations presented in FIGS. 12 through 16. The carrier body internal pivotal ramp subassembly 250 functions as an independently operated subassembly. The carrier body internal pivotal ramp subassembly 250 comprises an internal ramp pivot 260 integrated into a carrier ramp assembly 252. The carrier ramp assembly 252 is fabricated of a series of interlocking floor extrusions 264 and a pivot floor member 262 assembled at the loading end of the carrier ramp assembly 252. Each of the interlocking floor extrusions 264 is formed to include an engagement interface receiver 269 along a first edge and an engagement interface hook 268 along a second edge. The engagement interface receiver 269 engages with the engagement interface hook 268 forming a locking floor engagement interface 266 along at least a portion of the length of the interlocking floor extrusion 264. The carrier body floor assembly 116 can be fabricated of a similar series of interlocking floor extrusions 264 of the carrier ramp assembly 252. An optional end cap extrusion (not shown, but well understood) can be provided on the exposed (loading) end of the carrier body floor assembly 116 and the cab end of the carrier ramp assembly 252. A pivotal floor side support and track member 272 can be assembled along each edge of the carrier ramp assembly 252, providing additional rigidity to the carrier ramp assembly 252.

A carrier body approach plate member 254 is provided aft of the carrier ramp assembly 252. The carrier body internal pivotal ramp subassembly 250 is pivotally attached to the carrier body edge rail 114 of the carrier body subassembly 110 via an internal ramp pivot 260. A pivotal control assembly is provided between a cab end of the carrier body internal pivotal ramp subassembly 250 and a respective location on the carrier body edge rail 114, as illustrated, or carrier body sill frame channel 118. The disclosure presents two exemplary embodiments of the pivotal control assembly. The first exemplary embodiment is presented in FIG. 13, utilizing an internal pivot ramp control cable chain 282, which is secured to the carrier body internal pivotal ramp subassembly 250 via a cable chain anchor 284, redirected over a cable chain redirecting pulley 286 and operated via an internal pivot ramp drive apparatus 280. A pressurized tensioning device 270 (such as a hydraulic actuator) can be provided as an alternate embodiment or as a supplemental support to the cable chain embodiment. A second exemplary embodiment is presented in FIG. 14, utilizing a ramp pivot cam 290. A cam actuator 292 rotates the ramp pivot cam 290 via a cam rotation 294 about a body pivot interface 296 to raise and lower the carrier body internal pivotal ramp subassembly 250 via a ramp pivot interface 298. The ramp pivot interface 298 is preferably a pinned bearing block allowing for dimensional adjustments to avoid any binding along pivotal floor side support and track member 272.

Figure 15:
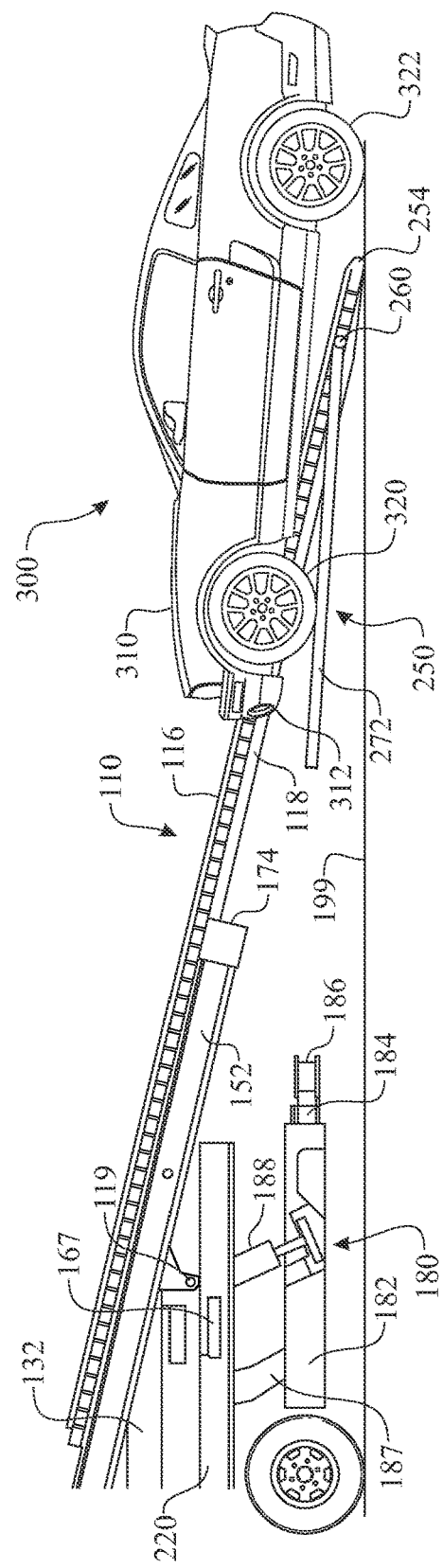
FIG. 15 presents a side elevation view of a rear portion of the carrier vehicle positioned in a loading configuration.

The operator aligns the carrier assembly 100 with a transported vehicle-for-tow 300 or a vehicle-for-tow, leaving sufficient space therebetween for sliding and positioning the carrier body subassembly 110 into a loading position. The vehicle-for-tow 300 can be loaded from the front or rear. The vehicle-for-tow 300 is defined has having a transported vehicle body 310 riding upon loading wheels 320 and trailing wheels 322. The transported vehicle body 310 includes a transported vehicle lower valance 312, wherein the transported vehicle lower valance 312 is the lowest leading edge of the vehicle-for-tow 300 and the lowest trailing edge of the vehicle-for-tow 300. It is common that the transported vehicle lower valance 312 becomes damaged during a process of loading the vehicle-for-tow 300 onto a conventional carrier body subassembly 110. The operator would direct the carrier body subassembly 110 into an angled, loading configuration, positioning the carrier body approach plate member 254 in contact with the supporting surface 199. The operator would then rotate the carrier body internal pivotal ramp subassembly 250, as described above, into a horizontal or nearly horizontal, loading configuration as illustrated in FIG. 15. This feature allows for damage free loading of a transported vehicle 300 having a low transported vehicle lower valance 312 or other low feature located forward of loading wheels 320. The service person would load the loading wheels 320 onto the carrier body ramp flooring 252, where the leading edge of the transported vehicle body 310 remains clear of a rear edge of the carrier body support planks 116. The leading edge of the carrier body ramp flooring 252 is then rotated, orienting the carrier body ramp flooring 252 to be parallel and in alignment with the carrier body support planks 116. The vehicle-for-tow 300 is drawn forward, loading the vehicle-for-tow 300 onto the carrier body subassembly 110.

An independent wheel lift subassembly 180 can be integrated onto the carrier vehicle 200 as best shown in FIGS. 7-9 and 17-21. The independent wheel lift subassembly 180 is a complete subassembly, having an independent wheel lift pivotal lifting boom assembly 182 pivotally attached to an independent wheel lift slide enabling subframe 181 via a pivotal boom transverse support member 189. At least one independent wheel lift pivotal boom lifting actuator 188 provides a drive mechanism to pivot the independent wheel lift pivotal lifting boom assembly 182 via the pivotal boom transverse support member 189. In the exemplary embodiment, independent wheel lift pivotal lifting boom assembly 182 is affixed to the pivotal boom transverse support member 189 and rotates about the independent wheel lift lifting boom trunion pivot 196. When the independent wheel lift pivotal boom lifting actuator 188 extends, the independent wheel lift pivotal lifting boom assembly 182 pivots downward towards a loading configuration. When the independent wheel lift pivotal boom lifting actuator 188 contracts, the independent wheel lift pivotal lifting boom assembly 182 pivots upward, lifting the towed vehicle into a transporting configuration. The independent wheel lift extendible inner boom 184 is slideably assembled within the independent wheel lift pivotal lifting boom assembly 182 and horizontally positioned via an independent wheel lift extensible inner boom motive actuator 198. The actuator 198 (not shown, but well understood) is preferably a dual action, hydraulic piston assembly. An independent wheel lift rotational cross bar 186 is provided along a distal end of the independent wheel lift extendible inner boom 184. The independent wheel lift rotational cross bar 186 is preferably configured to be perpendicular to the independent wheel lift extendible inner boom 184 and parallel to the supporting surface 199. The independent wheel lift rotational cross bar 186 can include features commonly associated with presently available wheel lifts, such as self-actuating wheel grabbers. The independent wheel lift rotational cross bar 186 can be connectively assembled to the independent wheel lift extendible inner boom 184, allowing the owner/operator to exchange the independent wheel lift rotational cross bar 186 with various specialized automotive vehicle wheel retaining devices commonly available through third party automotive towing equipment manufacturers or suppliers.

When the independent wheel lift subassembly 180 is in a retracted, stored configuration, the independent wheel lift rotational cross bar 186 acts as an under ride, protective device member upon collision with other vehicles following the carrier vehicle 200. Since the independent wheel lift subassembly 180 operates independently from the carrier body subassembly 110, and its adjoining subassemblies 170 and 150, the independent wheel lift rotational cross bar 186 can be positioned against the supporting surface 199 when loading vehicles onto the carrier body subassembly 110. This increases the stability of the carrier vehicle 200 during loading/unloading of vehicles from the carrier body subassembly 110.

The independent wheel lift slide enabling subframe 181 is within the wheel lift fore/aft slide channel 187 of the chassis mounting platform assembly 130. The independent wheel lift fore/aft motion actuator 185 is integrated into the independent wheel lift subassembly 180, having a first end attached to a member of the chassis mounting platform assembly 130 and a second end attached to the independent wheel lift slide enabling subframe 181. In the exemplary embodiment, the first end of the independent wheel lift fore/aft motion actuator 185 is attached to the independent wheel lift subassembly support cross member 140 of the chassis mounting platform assembly 130. The second end of the independent wheel lift fore/aft motion actuator 185 is attached to the wheel lift pivot actuator connecting bracket 168 which is affixed to wheel lift cross member 167 of the independent wheel lift slide enabling subframe 181. The independent wheel lift fore/aft motion actuator 185 extends and contracts to position the independent wheel lift subassembly 180 within the respective wheel lift fore/aft slide channels 187 of the chassis mounting platform assembly 130 between a retracted stowed position and a rearward, towing position.

The present invention provides several advantages over the existing art in the industry. The carrier assembly 100 is designed as a complete subassembly, allowing for its installation onto any reasonably sized truck chassis frame 220. Adaptors 222, 224 (FIG. 20) can be provided for mounting and securing the chassis mounting platform assembly 130 onto a variety of vehicle chassis frames 220 of varying dimensions. This provides for a standardized carrier assembly 100 and mounting means that will accommodate a variety of vehicle chassis without changes or compromises of the carrier vehicle. The carrier body assembly 100 need only to be of sufficient length to accommodate the overall wheel base spread of the transported vehicle, without concern of a rearward over extended body or platform, simply to provide a longer ramp in order to secure a reduced loading angle during loading/unloading. The new inventive matter with a shortened carrier body assembly, and accompanying subassemblies, with ability to be pivotally postured and transferred rearward upon initiation of its operative sequence through its intermediate connecting subassembly 150 provides for the same resultant decreased loading angle, which is then further enhanced by the downward deployment of the inclusive carrier body pivotal ramp subassembly 250.

The angle of the carrier assembly 100 is achieved via a single actuator motion, via the carrier tilt and longitudinal control inner subframe motion actuator 176. This controlled action of carrier assembly 100 and the sliding interface activity between the carrier intermediate subframe subassembly 150 and the carrier tilt and longitudinal control inner pivotal subassembly 170, minimizes operator error resulting from incorrect rotation of the carrier body subassembly 110. Integrating a carrier body internal pivotal ramp subassembly 250 within allows the operator to further optimize a transition for loading of a vehicle to be carried between the supporting surface 199 and the angled carrier body floor assembly 116, thus providing loading without abrasion or damage to a vehicle having a low front or rear clearance.

The assemblage of the carrier body floor assembly 116 utilizing a series of interlocking extrusions, such as the interlocking floor extrusion 264, which provides a rigid structure with minimal framing and fabrication cost.

It is understood that lighting would be integrated onto the carrier assembly 100 to ensure the lighting complies with the respective state and federal regulations for the carrier vehicle 200 as converted. This would accommodate conversions using light and medium duty trucks into the carrier vehicle 200.

Figure 22:
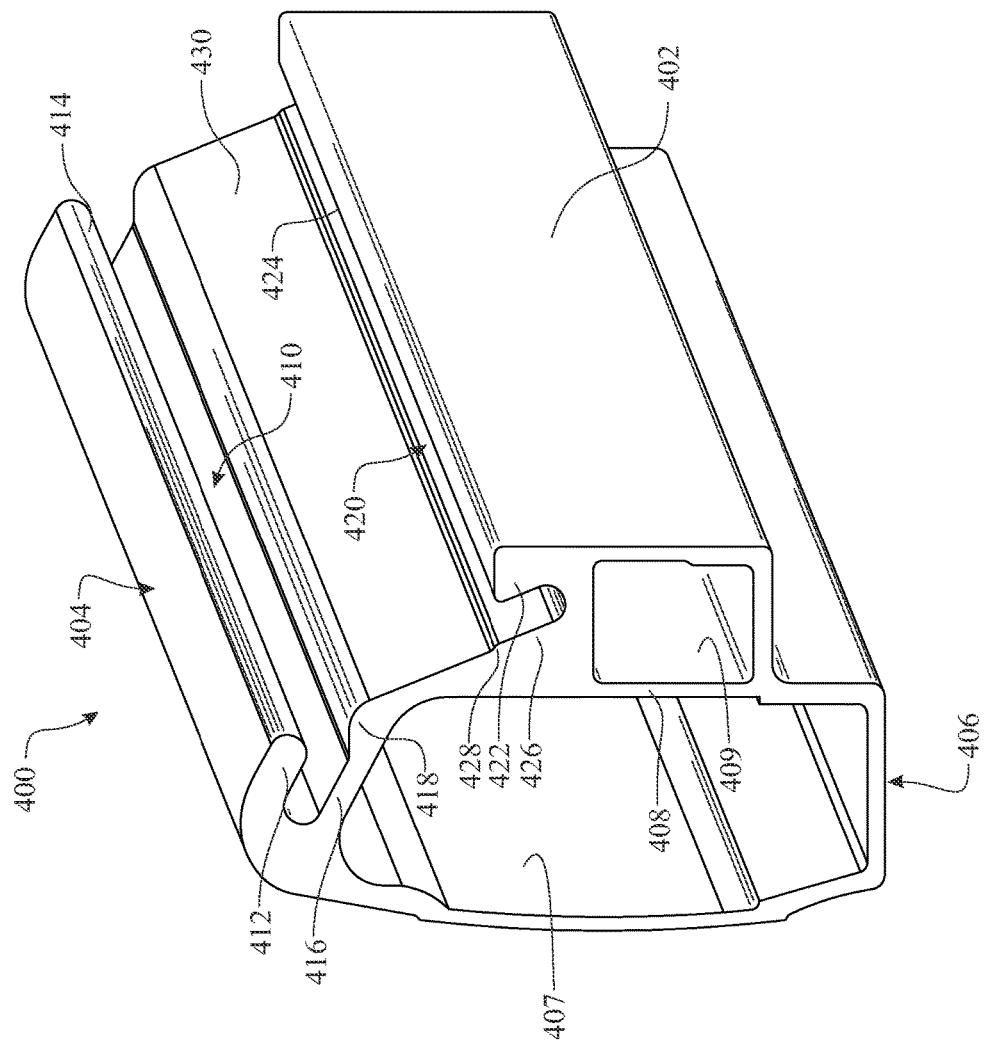
FIG. 22 presents an isometric end view of an exemplary carrier hook receiving edge rail comprising an upper hook receptacle and a lower hook receptacle.

It is recognized that it would be beneficial to integrate a cargo securing system into the carrier body subassembly 110. One exemplary cargo securing system employs a carrier hook receiving edge rail 400, as shown in FIGS. 22 through 31. Features of the exemplary carrier hook receiving edge rail 400 are best shown in FIG. 22. Orientation of the carrier hook receiving edge rail 400 can be reference by a carrier edge rail top surface 404 and a carrier edge rail bottom surface 406. The carrier hook receiving edge rail 400 is preferably formed by an extruding process, thus maintaining a consistent cross sectional shape along an entire length thereof. It is understood that the carrier hook receiving edge rail 400 can be formed using alternative methods to achieve the desire shape and associated functionality. The carrier hook receiving edge rail 400 can additionally be subjected to subsequent machining and/or other finishing procedures to introduce other features, such as assembly enhancing features, notches for insertion and removal of components, such as a sliding latching base element 600 (FIG. 27), and the like. The carrier hook receiving edge rail 400 can be finished using any suitable material finishing processes, including anodizing, painting, powder-coating, plating, and the like.

The exemplary carrier hook receiving edge rail 400 includes an upper hook receptacle 410 for receiving one or more components that could be subjected to an upward tensile force and a lower hook receptacle 420 for receiving one or more components that that could be subjected to a more horizontally oriented tensile force. The carrier hook receiving edge rail 400 can include one or both of the upper hook receptacle 410 and lower hook receptacle 420. The upper hook receptacle 410 is defined by an upper hook receptacle cantilevered arm 412 extending generally parallel to an upper hook receptacle base element 416. The upper hook receptacle cantilevered arm 412 terminates at a free end, referred to as an upper hook cantilevered arm distal end 414. The upper hook receptacle cantilevered arm 412 and associated upper hook receptacle base element 416 are preferably oriented extending generally downward towards an insertion opening of the upper hook receptacle 410. This orientation of the designed upper hook receptacle 410 counters any upward tensile forces applied by components inserted into the upper hook receptacle 410. The lower hook receptacle 420 is defined by a lower hook receptacle cantilevered arm 422 extending generally parallel to a lower hook receptacle base element 426. The lower hook receptacle cantilevered arm 422 terminates at a free end, referred to as a lower hook cantilevered arm distal end 424. The lower hook receptacle cantilevered arm 422 and associated lower hook receptacle base element 426 are preferably oriented extending generally upward towards an insertion opening of the lower hook receptacle 420. This orientation of the designed lower hook receptacle 420 counters any generally horizontal tensile forces applied by components inserted into the lower hook receptacle 420. In a preferred embodiment, the at least one upper hook receptacle 410 and lower hook receptacle 420 would extend an entire length of the carrier hook receiving edge rail 400.

The carrier hook receiving edge rail 400 can include additional features to retain components within the at least one upper hook receptacle 410 and lower hook receptacle 420. An upper hook receptacle retention feature 418 can be formed parallel to and proximate the upper hook cantilevered arm distal end 414, wherein the upper hook receptacle retention feature 418 would define an origin of the upper hook receptacle base element 416. The upper hook receptacle retention feature 418 extends upwards, towards the upper hook receptacle 410. The geometry of the upper hook receptacle retention feature 418 would increase retention of the latching component within the upper hook receptacle 410. The increased retention is geometrically provided, as the latching component (such as an upper hook assembly 500 of FIGS. 24 and 26) would need to be rotated to an angle that is greater than an angle defined by a tensile force generated by a tie down strap 510 (FIGS. 24 and 26) in order to become disengaged from the upper hook receptacle 410.

Alternatively, a lower hook receptacle retention feature 428 can be incorporated to increase rotation of a latching component for insertion and removal. The exemplary lower hook receptacle retention feature 428 can be formed parallel to and proximate the lower hook cantilevered arm distal end 424, wherein the lower hook receptacle retention feature 428 would define an origin of the lower hook receptacle base element 426. The lower hook receptacle retention feature 428 extends outward, away from the lower hook receptacle 420, providing clearance to enable rotation of a lower hook assembly 550 (FIGS. 25 and 26) for insertion and removal from the 420.

Figure 24:
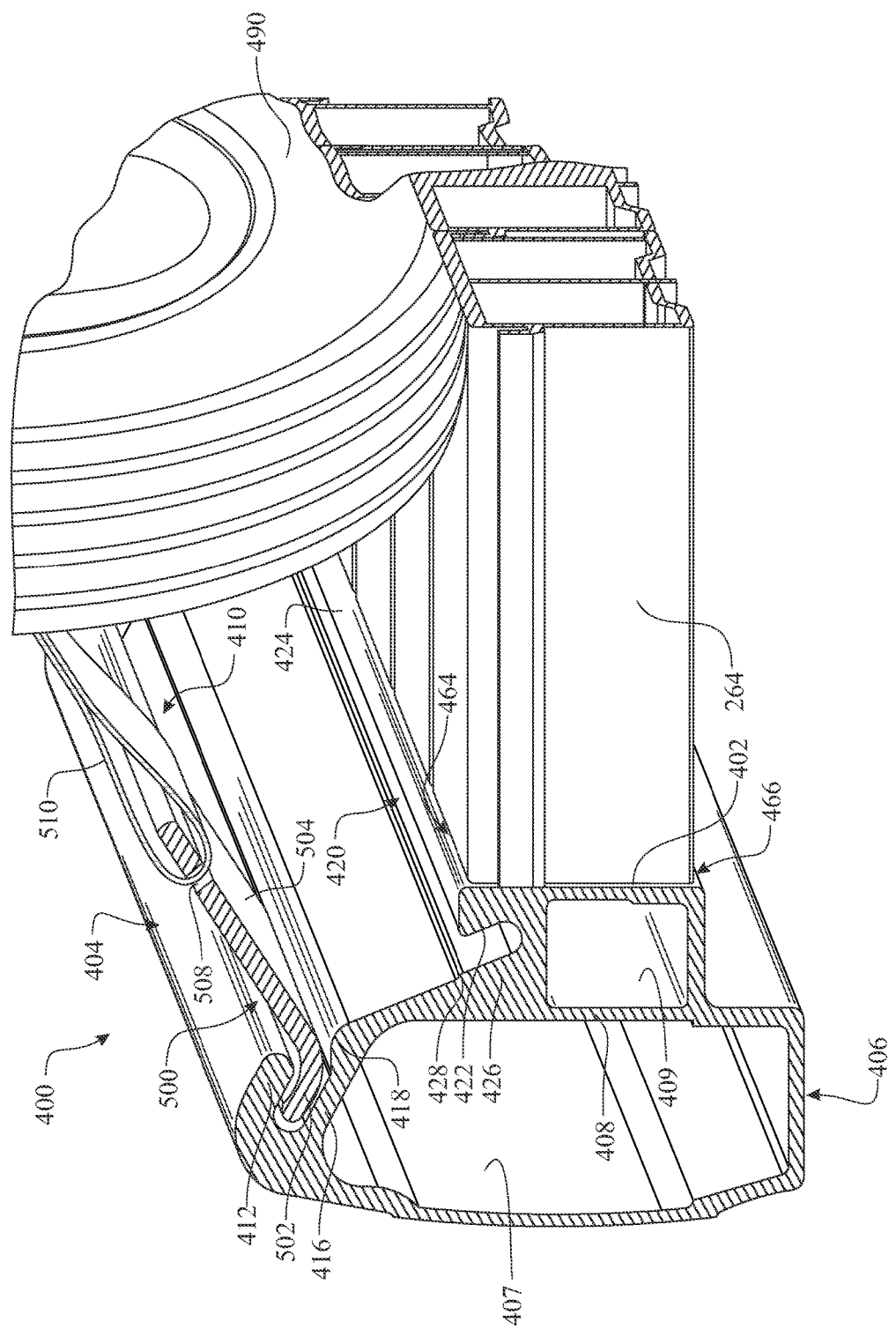
FIG. 24 presents an isometric view of an exemplary application employing an upper hook assembly for securing a vehicle to the carrier platform.

The carrier hook receiving edge rail 400 can include a carrier edge rail primary interior surface 407 and one or more carrier edge rail interior structural support 408 defining one or more associated carrier edge rail secondary interior surfaces 409 to reduce material consumption and costs, reduce overall weight, and maintain structural rigidity. The features can additionally enhance an assembly process for assembling the carrier hook receiving edge rail 400 to the carrier body 110. For example, a carrier edge rail attachment surface 402 of each carrier hook receiving edge rail 400 can be welded to the carrier body subassembly 110 using an assembly upper surface weld 464 and/or an assembly lower surface weld 466, as indicated in FIG. 24. The welding process is reliant upon thermodynamics of the components to be welded together. The energy required to adequately form each weld is proportional to the concentrated mass of the material of each component along the weld site. By introducing a hollow area defined by the carrier edge rail secondary interior surface 409, the wall thickness of the carrier edge rail attachment surface 402 is reduced. This design directs the thermal energy into creating a suitable weld between the carrier edge rail attachment surface 402 and a mating edge of each interlocking floor extrusion 264. Alternatively, the carrier hook receiving edge rail 400 can be assembled to the series of interlocking floor extrusions 264 using mechanical fasteners. The hollow interior section defined by the carrier edge rail secondary interior surface 409 and optionally, a second hollow interior section defined by the carrier edge rail primary interior surface 407 provides the installer access for insertion and assembly of the mechanical fasteners.

Figure 23:
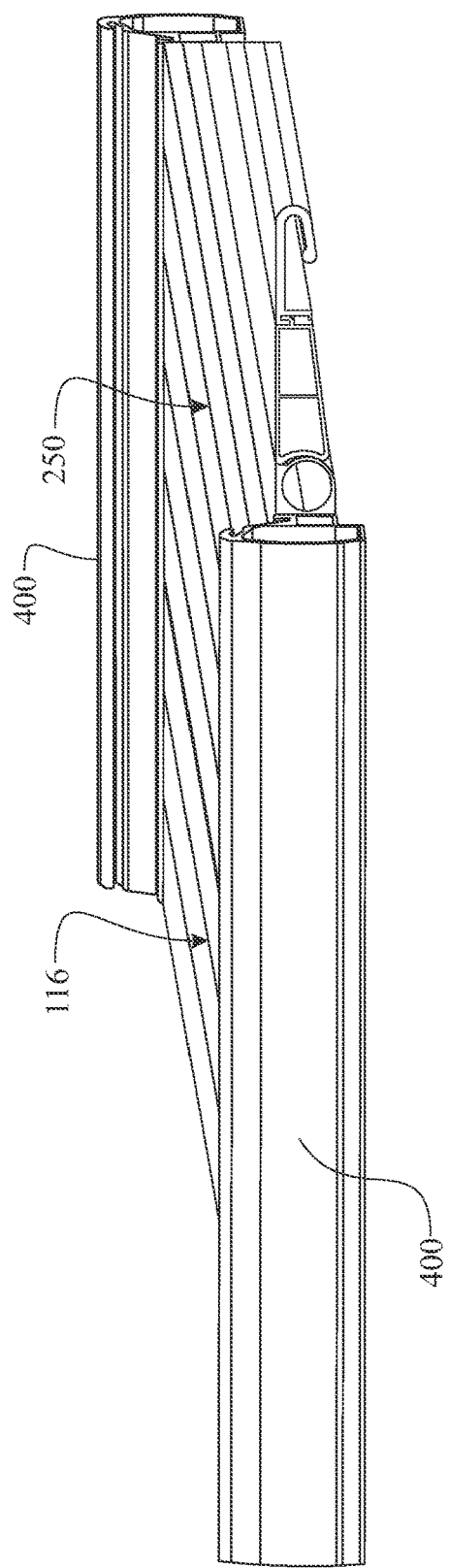
FIG. 23 presents an isometric view of an exemplary carrier platform having hook receiving edge rails assembled to each longitudinal edge.

The carrier body subassembly 110 can be enhanced by utilizing the carrier hook receiving edge rail 400 for at least one carrier body edge rail 114, as presented in FIG. 23. The carrier hook receiving edge rail 400 can be assembled to the carrier body subassembly 110 using any suitable assembly process, including welding, employment of mechanical fasteners, integration of a sliding assembly connectivity design, and the like and any combination thereof. In the exemplary embodiment, the carrier hook receiving edge rail 400 is oriented placing each of the upper hook receptacle 410 and lower hook receptacle 420 proximate the carrier bed 110. The upper hook receptacle 410 and lower hook receptacle 420 would be located towards an upper portion of the carrier hook receiving edge rail 400; and more specifically between the carrier edge rail attachment surface 402 and the carrier edge rail top surface 404.

A first exemplary application of the carrier hook receiving edge rail 400 is presented in FIG. 24, wherein an upper hook assembly 500 is inserted into the upper hook receptacle 410. The upper hook assembly 500 is formed defining an upper hook engaging tab segment 502 and an upper hook strap retaining segment 504. An upper hook strap receiving slot 508 is provided through the upper hook strap retaining segment 504. A tie down strap 510 is inserted through and retained by the upper hook strap receiving slot 508. The upper hook assembly 500 would be rotated, directing insertion of the upper hook engaging tab segment 502 into the upper hook receptacle 410. The upper hook engaging tab segment 502 would be routed about the upper hook receptacle retention feature 418 and subsequently rotated towards a center of the carrier body subassembly 110. The upper hook receptacle retention feature 418 retains the upper hook engaging tab segment 502 of the rotated upper hook assembly 500 within the upper hook receptacle 410. The tie down strap 510 would be secured to an object, such as a vehicle tire 490, a frame member of a vehicle, a suspension member of the vehicle, and the like. The tie down strap 510 is tightened using any suitable tightening assembly, creating a tensile force. The direction of the tensile force retains the upper hook assembly 500 in mechanical communication with the upper hook receptacle 410.

Figure 25:
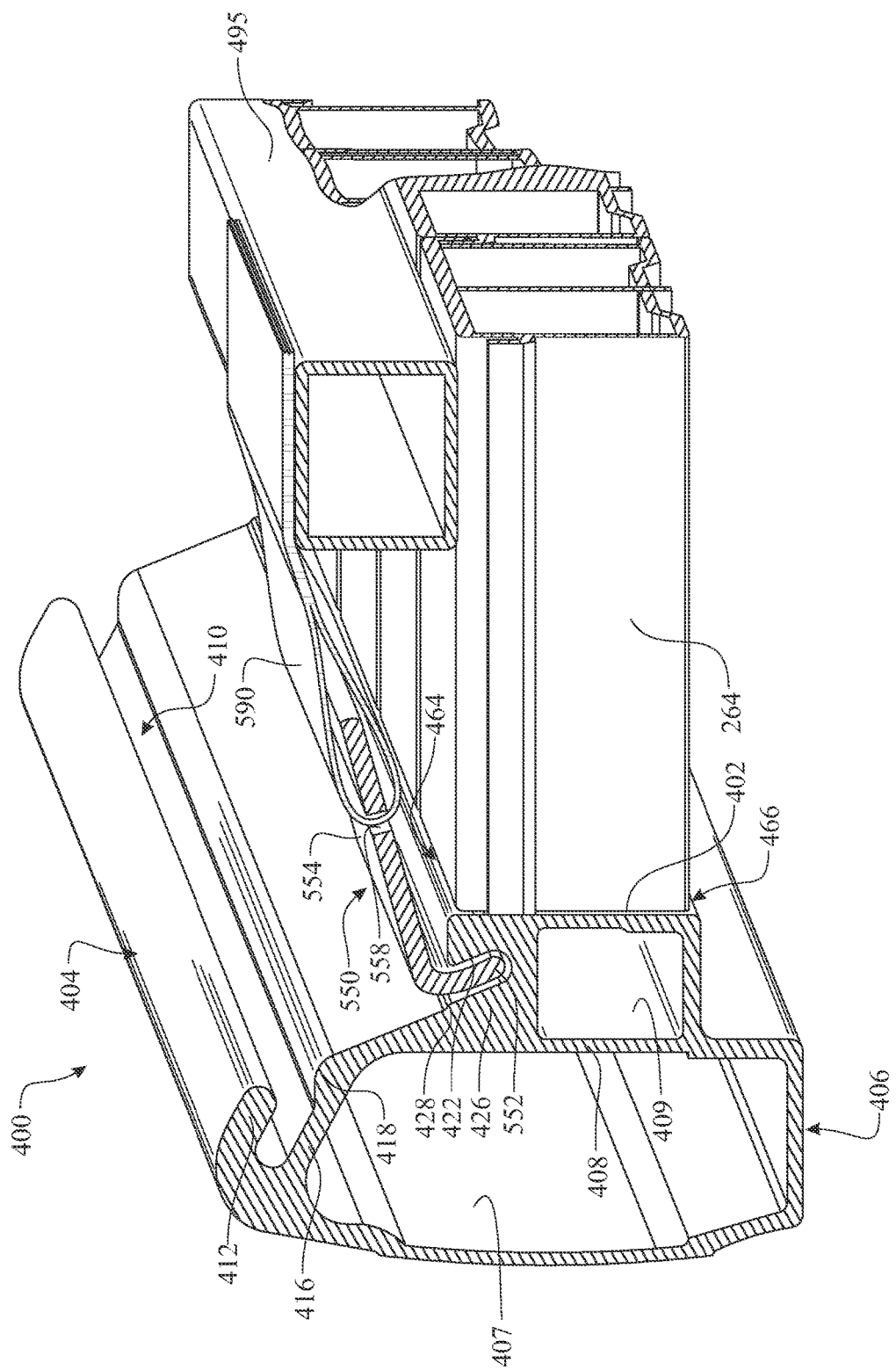
FIG. 25 presents an isometric view of an exemplary application employing a lower hook assembly for securing cargo to the carrier platform.

A second exemplary application of the carrier hook receiving edge rail 400 is presented in FIG. 25, wherein a lower hook assembly 550 is inserted into the lower hook receptacle 420. The lower hook assembly 550 is formed defining a lower hook engaging tab segment 552 and a lower hook strap retaining segment 554. A lower hook strap receiving slot 558 is provided through the lower hook strap retaining segment 554. A tie down strap 590 is inserted through and retained by the lower hook strap receiving slot 558. The lower hook assembly 550 would be oriented, directing insertion of the lower hook engaging tab segment 552 into the lower hook receptacle 420. The lower hook receptacle retention feature 428 provides clearance for the lower hook assembly 550, enabling insertion of the lower hook engaging tab segment 552 into the upper and lower hook intermediary section 430. The tie down strap 590 would be routed to secure an object, such as a miscellaneous cargo 495, a frame member of a vehicle, a suspension member of the vehicle, and the like. The tie down strap 590 is tightened using any suitable tightening assembly, creating a tensile force. The direction of the tensile force retains the lower hook engaging tab segment 552 of the lower hook assembly 550 in mechanical communication with the lower hook receptacle 420.

Figure 26:
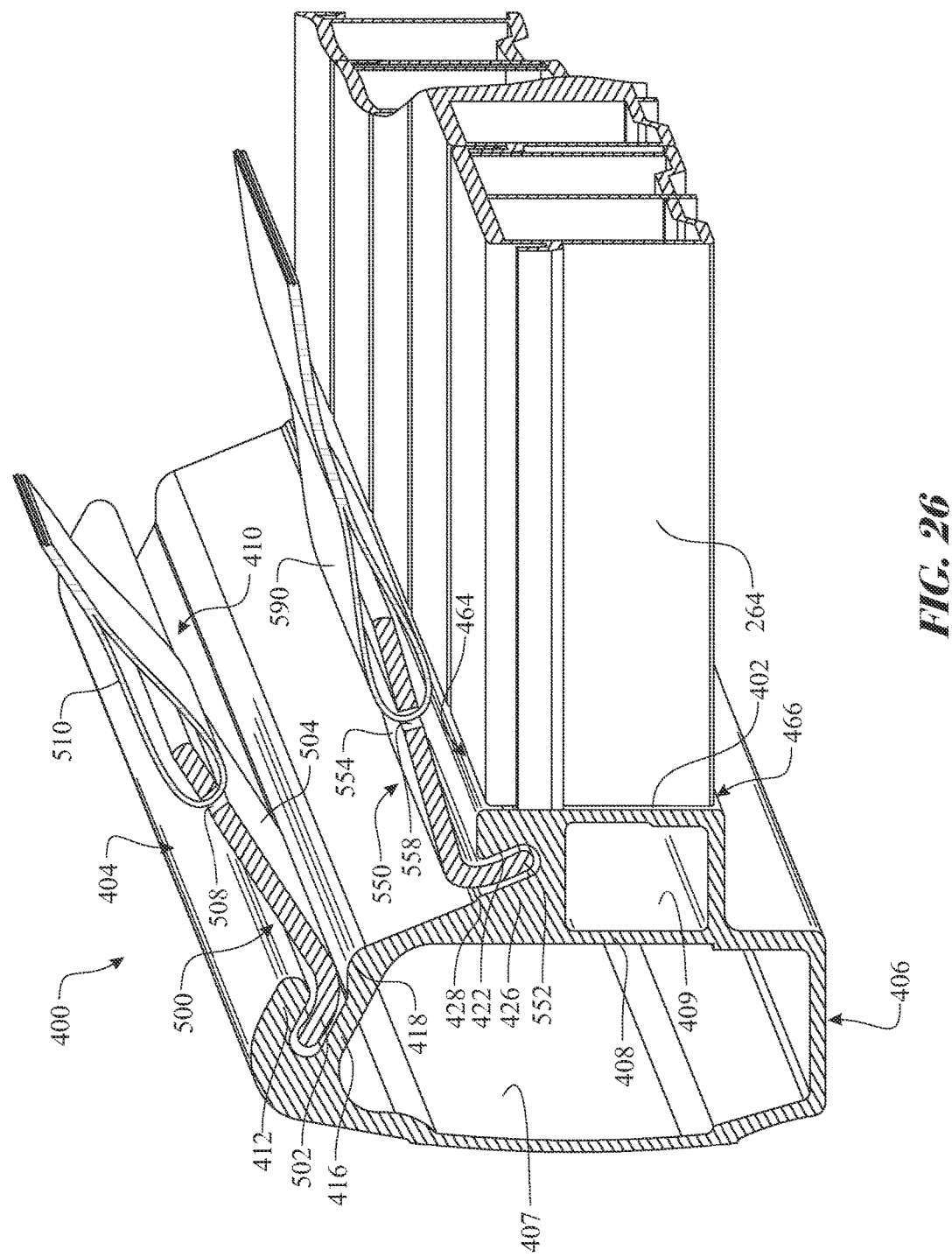
FIG. 26 presents an isometric view of an exemplary application employing a combination of the upper hook assembly and the lower hook assembly for securing one or more objects to the carrier platform.
Figure 27:
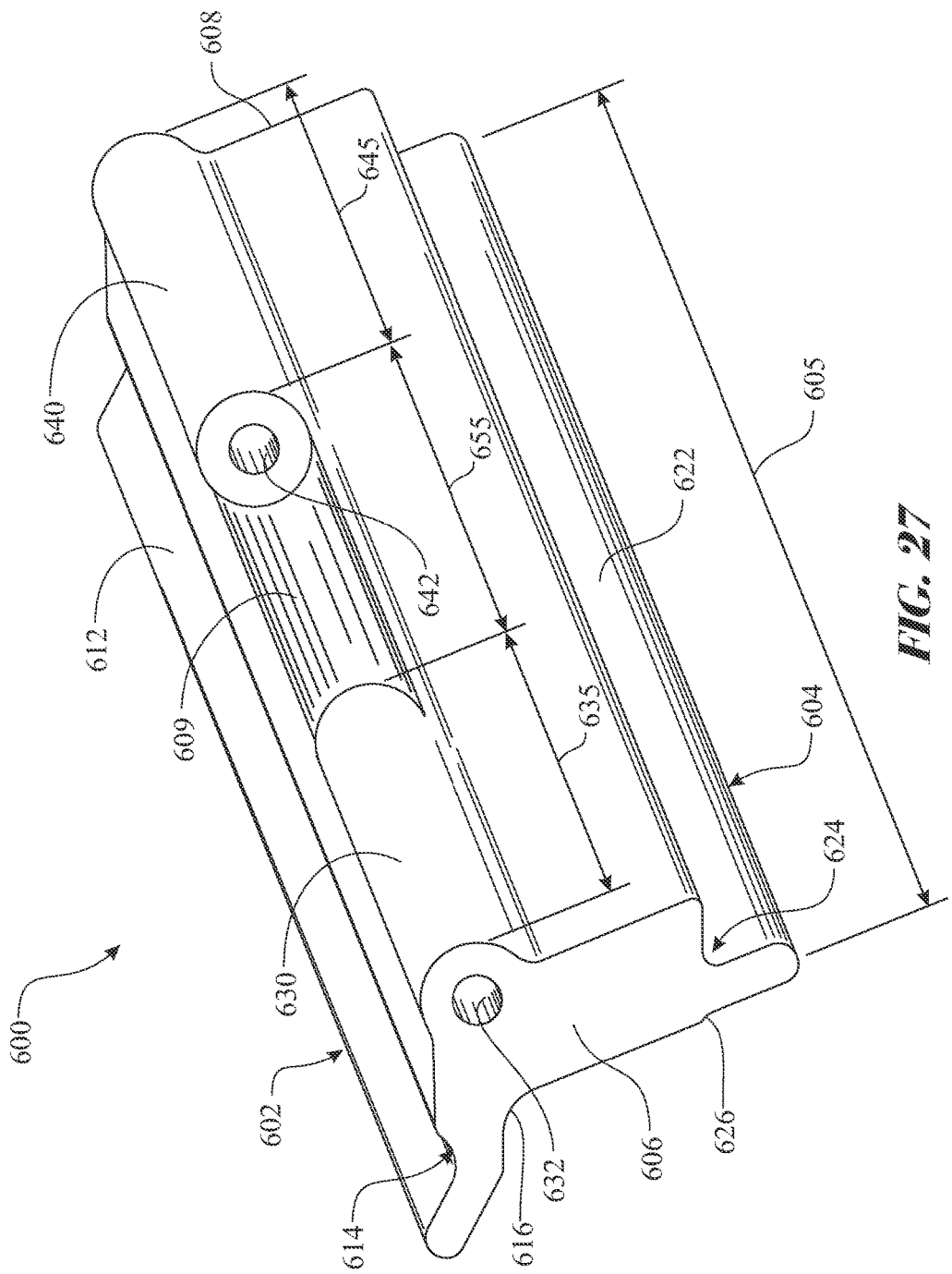
FIG. 27 presents an isometric view of an exemplary sliding latching base element of a sliding latching element assembly.

A third exemplary application of the carrier hook receiving edge rail 400 is presented in FIG. 26, wherein the upper hook assembly 500 is inserted into the upper hook receptacle 410 and the lower hook assembly 550 is inserted into the lower hook receptacle 420. The tie down strap 510 and tie down strap 590 can be separate straps used for separate applications, they can be separate straps joined for a single application, or they can be the same, continuous strap.

The above exemplary applications employ one or more hook assemblies 500, 550. It is understood that the towing service person can use any number of hooks along the length of each carrier hook receiving edge rail 400 to adequately secure a vehicle, cargo, or a combination thereof to the carrier body subassembly 110. The ability to insert each hook assembly 500, 550 into the respective hook receptacle 410, 420 simplifies the securing process, as the service person can locate each hook assembly 500, 550 as needed.

The above exemplary applications employ one or more hook assemblies 500, 550 introduces a limitation, where, when the hook assemblies 500, 550 are not subjected to a tensile force, the hook assemblies 500, 550 would need to be removed and stored. This introduces risk of loss and/or unavailability when needed. An alternative solution employs a sliding latching element assembly illustrated in FIGS. 27 through 31.

Figure 28:
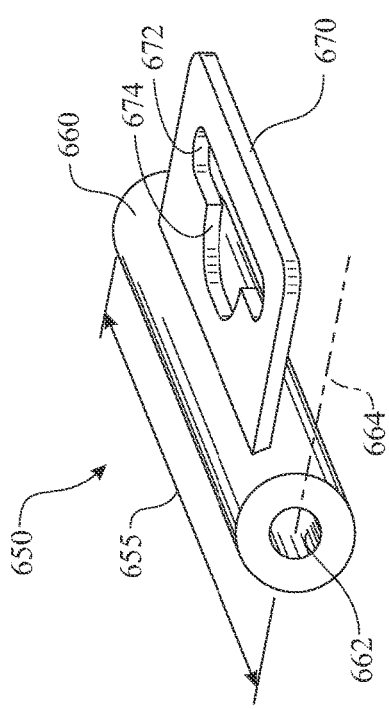
FIG. 28 presents an isometric view of an exemplary pivotal latching element of the sliding latching element assembly.
Figure 29:
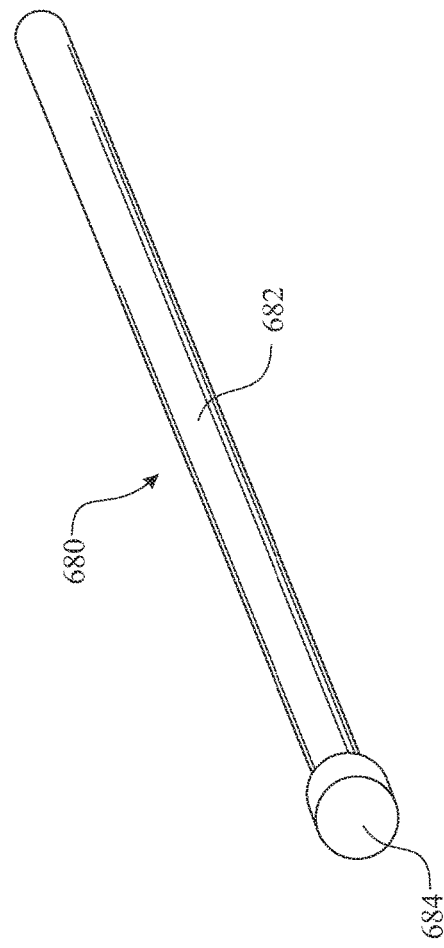
FIG. 29 presents an isometric view of an exemplary hinge pin used to assemble the pivotal latching element and the sliding latching base element together creating the sliding latching element assembly.

The exemplary sliding latching element assembly includes a sliding latching base element 600 (detailed in FIG. 27), a pivotal latching element 650 (detailed in FIG. 28), and a latching element hinge assembly pin 680 (detailed in FIG. 29). A base material for the sliding latching base element 600 is preferably fabricated using an extruding process, maintaining a uniform cross sectional shape and size along an entire length thereof. The cross section shape includes a first sliding flange 612 extending outward from a main body segment in a first direction and a second sliding flange 622 extending outward from the main body segment in a second, generally opposite direction. The first sliding flange 612 would terminate along a first base element elongated edge 602. The second sliding flange 622 would terminate along a second base element elongated edge 604. In the exemplary embodiment, the first base element elongated edge 602 would define an upper edge and the second base element elongated edge 604 would define a lower edge. A first flange outer surface ridge 614 can be incorporated into the design of the sliding latching base element 600, wherein the first flange outer surface ridge 614 provides a transition between an exterior surface of the first sliding flange 612 and the main body of the sliding latching base element 600. A first flange contact surface ridge 616 can be incorporated into the design of the sliding latching base element 600, wherein the first flange contact surface ridge 616 provides a transition between a, opposite base surface of the first sliding flange 612 and the main body of the sliding latching base element 600. A second flange outer surface ridge 624 can be incorporated into the design of the sliding latching base element 600, wherein the second flange outer surface ridge 624 provides a transition between an exterior surface of the second sliding flange 622 and the main body of the sliding latching base element 600. A second flange contact surface ridge 626 can be incorporated into the design of the sliding latching base element 600, wherein the second flange contact surface ridge 626 provides a transition between a, opposite base surface of the second sliding flange 622 and the main body of the sliding latching base element 600.

The first sliding flange 612 would be shaped to slideably engage with the upper hook receptacle 410. The first sliding flange 612 is preferably designed having a shape that mimics the shape and dimensions of the upper hook receptacle 410. Similarly, the second sliding flange 622 would be shaped to slideably engage with the lower hook receptacle 420. The second sliding flange 622 is preferably designed having a shape that mimics the shape and dimensions of the lower hook receptacle 420. The first sliding flange 612 and the second sliding flange 622 would be arranged respective to one another to properly align with the upper hook receptacle 410 and lower hook receptacle 420, respectively.

Other features of the sliding latching base element 600 can be located, shaped, and sized to engage with mating features of the carrier hook receiving edge rail 400. For example, the first flange contact surface ridge 616 would slideably engage with the upper hook receptacle retention feature 418. The first flange outer surface ridge 614 would slideably engage with a distal edge of the upper hook receptacle cantilevered arm 412. The second flange contact surface ridge 626 would slideably engage with the lower hook receptacle retention feature 428. The second flange outer surface ridge 624 would slideably engage with a distal edge of the lower hook receptacle cantilevered arm 422.

The base material of the main body of the sliding latching base element 600 includes a semi-circular formation for defining knuckles 630, 640. A bore is located through a central region of the semi-circular formation, wherein the bore is subsequently segmented into a first pivot knuckle pin receiving bore 632 and a second pivot knuckle pin receiving bore 642 to receive a hinge pin elongated shaft 682 of a latching element hinge assembly pin 680 (FIG. 29). The base material is subjected to a secondary processing to define a sliding latching base element length 605 and introduce a latch coupling pivot clearance 609. The space associated with the latch coupling pivot clearance 609 can be referred to as a pivotal latching element receiving segment. The sliding latching base element length 605 extends between a first base element end surface 606 and a second base element end surface 608. The latch coupling pivot clearance 609 segments the semi-circular formation into the first latching element receiving pivot knuckle segment 630, the second latching element receiving pivot knuckle segment 640 and the latch coupling pivot clearance 609 extending therebetween. The latch coupling pivot clearance 609 is formed preferably having a concave shape, enabling a pivotal motion of the pivotal latching element 650. The latch coupling pivot clearance 609 extends between adjacent opposite facing ends of the first latching element receiving pivot knuckle segment length 635 and the second latching element receiving pivot knuckle segment length 645 having a dimension proximate a pivotal latching element length 655 of the pivotal latching element 650 (FIG. 28). It is understood that the span between adjacent opposite facing ends of the first latching element receiving pivot knuckle segment length 635 and the second latching element receiving pivot knuckle segment length 645 can be adjusted to accommodate pivot assembly components, such as washers, bushings, and the like.

Although the sliding latching base element 600 is described as being extruded and subsequently processed, it is understood that the sliding latching base element 600 can be fabricated using any suitable manufacturing process, including molding, machining, casting, and the like. The sliding latching base element 600 can be subjected to a post fabrication finishing process, such as anodizing, plating, painting, powder-coating, and the like.

Figure 31:
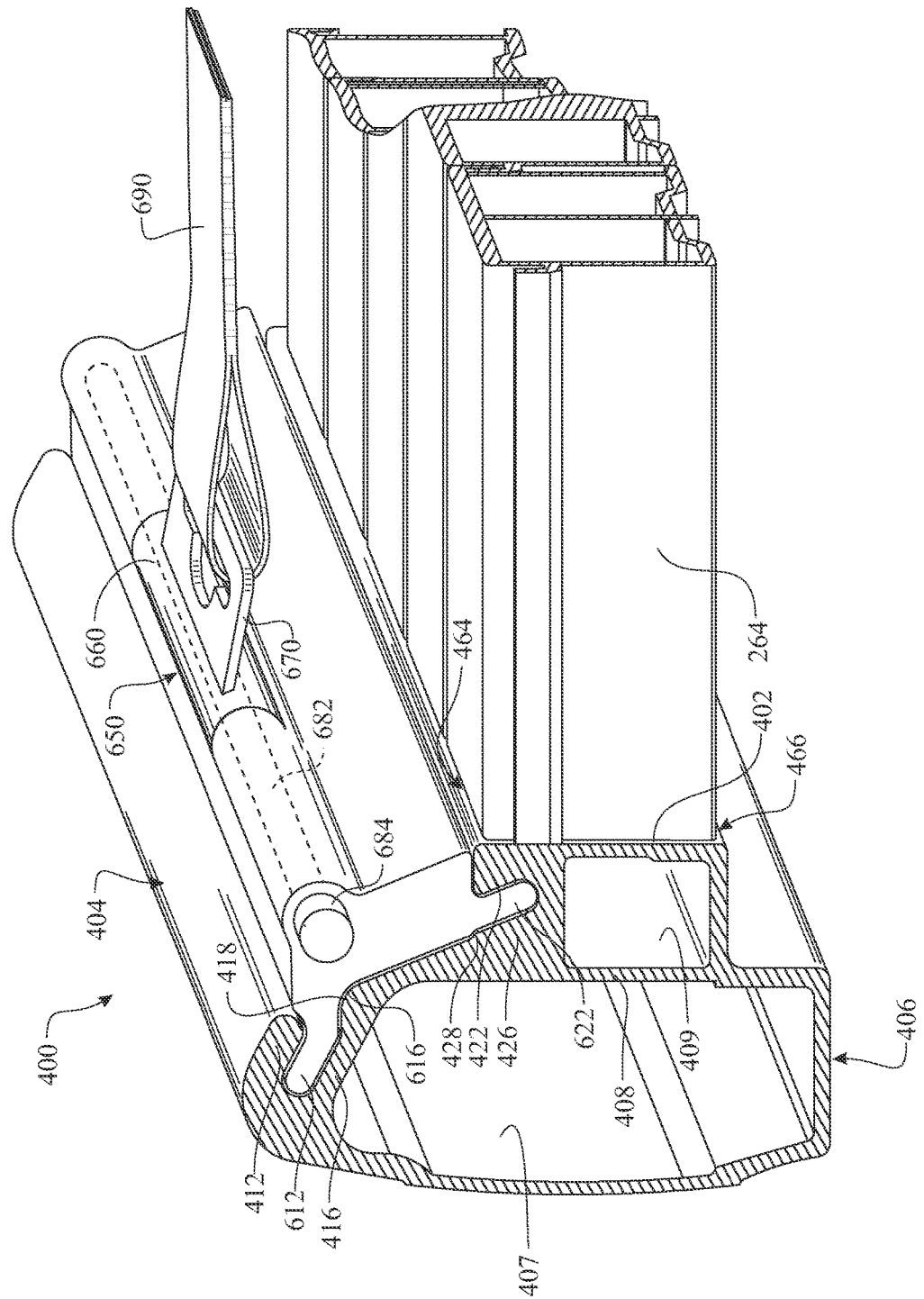
FIG. 31 presents an isometric view of the sliding latching element assembly assembled to the carrier hook receiving edge rail.

Details of the pivotal latching element 650 are presented in FIG. 28. The pivotal latching element 650 includes a strap attachment tab 670 extending generally radially outward from a latching element knuckle 660. The latching element knuckle 660 is preferably manufactured from a tubular material defining an exterior surface and a latching element knuckle bore 662, such as an extrusion. The latching element knuckle bore 662 is preferably concentrically located respective to a cross section shape of the latching element knuckle 660. The latching element knuckle bore 662 can include or exclude a bushing, a bearing, or any other pivot supporting feature. The strap attachment tab 670 can be fabricated from a plate material and subsequently welded to the latching element knuckle 660. The strap attachment tab 670 can be located extending radially outward from an outer surface of the latching element knuckle 660 along a radial centerline 664 or offset from the radial centerline 664 (as shown). A strap securing passageway is formed through the strap attachment tab 670 for receiving and securing a tie down strap 690 (FIG. 31). The strap securing passageway can be formed in any suitable shape. The exemplary strap securing passageway includes a strap receiving slot 672 and a working clearance 674. Although the exemplary embodiment incorporates a strap securing passageway, it is understood that any strap securing feature can be used, including a cleat, a hook, and the like.

The pivotal latching element 650 can be fabricated using any suitable manufacturing process, including extruding, molding, machining, casting, rolling, and the like and/or any combination thereof. The manufacturing process can additionally employ one or more secondary assembly processes, such as welding, and the like. The pivotal latching element 650 can be subjected to a post fabrication finishing process, such as anodizing, plating, painting, powder-coating, and the like.

Details of the latching element hinge assembly pin 680 are presented in FIG. 29. The latching element hinge assembly pin 680 includes a hinge pin head 684 provided at one end of a hinge pin elongated shaft 682. In a preferred embodiment, the hinge pin head 684 is concentrically located about a cross sectional shape of the hinge pin elongated shaft 682. A diameter of the hinge pin elongated shaft 682 can be sized to be press fit into the first pivot knuckle pin receiving bore 632 and the second pivot knuckle pin receiving bore 642. Alternatively, the hinge pin elongated shaft 682 can include one or more features for ensuring the latching element hinge assembly pin 680 remains assembled to the sliding latching base element 600 during use. For example, the hinge pin elongated shaft 682 can include knurling to provide mechanical interference, thus retaining the hinge pin elongated shaft 682 within the first pivot knuckle pin receiving bore 632 and the second pivot knuckle pin receiving bore 642. Another example would be to include a mechanical retention element at a distal end of the hinge pin elongated shaft 682, such as an aperture for receiving a pin, a threaded flange, a spring loaded bearing, and the like.

The latching element hinge assembly pin 680 can be fabricated using any suitable manufacturing process, including turning, molding, machining, casting, and the like or any combination thereof, and can additionally employ secondary assembly processes, such as welding, threading, and the like. The latching element hinge assembly pin 680 can be subjected to a post fabrication finishing process, such as anodizing, plating, painting, powder-coating, and the like.

Figure 30:
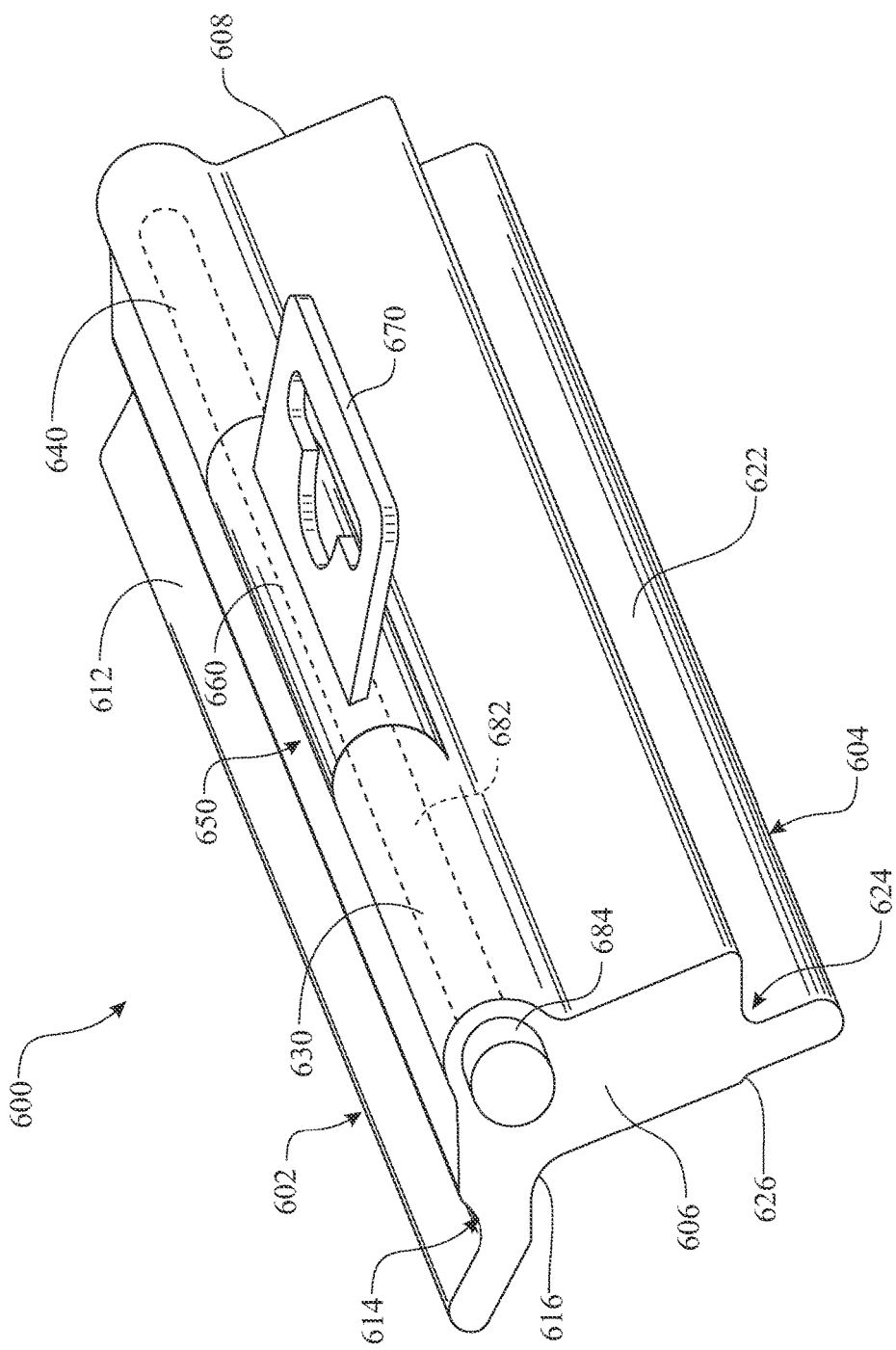
FIG. 30 presents an isometric view of the sliding latching element assembly.

The sliding latching base element 600, pivotal latching element 650, and latching element hinge assembly pin 680 are illustrated as an assembly in FIG. 30. The latching element knuckle 660 of the pivotal latching element 650 is inserted proximate the latch coupling pivot clearance 609, between the first latching element receiving pivot knuckle segment 630 and the second latching element receiving pivot knuckle segment 640. The hinge pin elongated shaft 682 of the latching element hinge assembly pin 680 is inserted through the first pivot knuckle pin receiving bore 632, continuing through the latching element knuckle bore 662, and through the second pivot knuckle pin receiving bore 642. The pivotal latching element 650 pivots about the hinge pin elongated shaft 682.

An exemplary application employing the sliding latching element assembly is presented in FIG. 31. The upper hook receptacle 410 and or the lower hook receptacle 420 provide a slot for receiving the sliding latching base element 600. It is understood that the slot can be provided in any suitable shape that would enable a sliding motion along a longitudinal length, while also providing a retention force when subjected to a lateral tensile force, such as a tensile force provided by the tie down strap 690.

One or more sliding latching element assemblies are slideably inserted into a slot extending longitudinally along the length of the carrier hook receiving edge rail 400. In the exemplary embodiment, the slot can be defined as any recession formed within a portion of the carrier hook receiving edge rail 400 above the upper surface of the interlocking floor extrusion 264 when assembled thereto. It is noted that the carrier edge rail attachment surface 402 can alternatively be used as a reference wherein the slot would be designed to provide access from a space above an upper edge of the carrier edge rail attachment surface 402. The slot is preferably formed including at least one undercut side of a "T-slot", wherein the at least one undercut would be at least one hook receptacle 410, 420. In a preferred embodiment, the slot would be provided as a "T-slot" formation including both hook receptacles 410, 420.

End caps or other elements can be assembled to each end of the carrier hook receiving edge rail 400 to entrap each of the one or more sliding latching element assemblies within the slot. In a preferred embodiment, a plurality of sliding latching element assemblies would be spatially arranged along the length of the carrier hook receiving edge rail 400. The tie down strap 690 is inserted through the strap receiving slot 672 of the strap attachment tab 670. A tensile force is generated by routing the tie down strap 690 to secure an object and tightening the tie down strap 690 using any suitable tension inducing mechanism, such as a ratcheting tie down strap, and adjustable buckle, a sliding tensioning device, and the like.

It is understood that the system can employ any combination of the upper hook assembly 500 and the lower hook assembly 550 in conjunction with the sliding latching element assembly.

The pivoting motion of the pivotal latching element 650 eliminates or significantly reduces any torsional impact on the sliding latching element assembly. Although the pivoting motion provides one desired aspect, it is understood that the sliding latching element assembly can be of any alternative design, including a one piece or unitarily constructed component that would provide the same function and achieve the same results.

A semi-solid lubricant, such as grease, can be applied between any two surfaces defining a moving interface. This can include along the slot, between the latching element knuckle bore 662 and the hinge pin elongated shaft 682, and the like.

Although the exemplary embodiments integrate at least of the upper hook receptacle 410 and the lower hook receptacle 420 into the carrier hook receiving edge rail 400, it is understood that any suitable tie down strap feature can be integral with the carrier body edge rail 114 or the carrier hook receiving edge rail 400, wherein the tie down strap feature is adapted to receiving and retaining the tie down strap or the tied down strap assembly including the upper hook assembly 500, the lower hook assembly 550, the sliding latching element, the sliding latching element assembly, or any other latching element.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REF. NO. DESCRIPTION

100 carrier assembly
110 carrier body subassembly
114 carrier body edge rail
116 carrier body floor assembly
118 carrier body sill frame channel
119 carrier tilt and longitudinal control inner subframe pivot
120 cab protector cage assembly
122 cab protector frame
124 cab protector mounting interface
125 cab protector mount receiver
130 chassis mounting platform assembly
132 mounting platform rail and chassis reinforcement member 134 headboard socket and reinforced mounting platform attachment device
136 pivot control plates
137 mounting platform pivot mating interface
140 independent wheel lift subassembly support cross member
142 tail light subassembly
146 carrier tilt and longitudinal control inner subframe cross member
148 carrier tilt and longitudinal control inner subframe slide channel
150 carrier intermediate subframe subassembly
152 carrier intermediate subframe rail
153 carrier intermediate subframe cross member
154 carrier pivotal control device
156 carrier pivot mating interface
158 carrier second pivot interface
160 carrier body longitudinal actuator member
162 carrier body actuator mounting and pivot bracket
164 motion actuator rod
165 wheel lift extension actuator assembly joint
167 wheel lift cross member
168 wheel lift pivot actuator connecting bracket
170 carrier tilt and longitudinal control inner pivotal subassembly
172 carrier tilt and longitudinal control inner pivotal subframe
174 carrier intermediate subframe rear cross member
176 carrier tilt and longitudinal control inner subframe motion actuator
178 independent wheel lift slide rail member
180 independent wheel lift subassembly
181 independent wheel lift slide enabling subframe
182 independent wheel lift pivotal lifting boom assembly
183 pivot actuator boom bracket
184 independent wheel lift extendible inner boom
185 independent wheel lift fore/aft motion actuator
186 independent wheel lift rotational cross bar
187 wheel lift fore/aft slide channel
188 independent wheel lift pivotal boom lifting actuator
189 pivotal boom transverse support member
190 rearward motion
192 pivotal motion
194 carrier body travel
196 independent wheel lift lifting boom trunion pivot
198 independent wheel lift extensible inner boom motive actuator
199 supporting surface
200 carrier vehicle
210 cab
220 truck chassis frame
222 adaptor
250 carrier body internal pivotal ramp subassembly
252 carrier ramp assembly
254 carrier body approach plate member
260 internal ramp pivot
262 pivot floor member
264 interlocking floor extrusion
266 floor engagement interface
268 engagement interface hook
269 engagement interface receiver
270 pressurized tensioning device
272 pivotal floor side support and track member
280 internal pivot ramp drive apparatus
282 internal pivot ramp control cable chain
284 cable chain anchor
286 cable chain redirecting pulley
290 ramp pivot cam
292 cam actuator
294 cam rotation
296 body pivot interface
298 ramp pivot interface
300 transported vehicle
310 transported vehicle body
312 transported vehicle lower valance
320 loading wheels
322 trailing wheels
400 carrier hook receiving edge rail
402 carrier edge rail attachment surface
404 carrier edge rail top surface
406 carrier edge rail bottom surface
407 carrier edge rail primary interior surface
408 carrier edge rail interior structural support
409 carrier edge rail secondary interior surface
410 upper hook receptacle
412 upper hook receptacle cantilevered arm
414 upper hook cantilevered arm distal end
416 upper hook receptacle base element
418 upper hook receptacle retention feature
420 lower hook receptacle
422 lower hook receptacle cantilevered arm
424 lower hook cantilevered arm distal end
426 lower hook receptacle base element
428 lower hook receptacle retention feature
430 upper and lower hook intermediary section
464 assembly upper surface weld
466 assembly lower surface weld
490 vehicle tire
495 miscellaneous cargo
500 upper hook assembly
502 upper hook engaging tab segment
504 upper hook strap retaining segment
508 upper hook strap receiving slot
510 tie down strap
550 lower hook assembly
552 lower hook engaging tab segment
554 lower hook strap retaining segment
558 lower hook strap receiving slot
590 tie down strap
600 sliding latching base element
602 first base element elongated edge
604 second base element elongated edge
605 sliding latching base element length
606 first base element end surface
608 second base element end surface
609 latch coupling pivot clearance
612 first sliding flange
614 first flange outer surface ridge
616 first flange contact surface ridge
622 second sliding flange
624 second flange outer surface ridge
626 second flange contact surface ridge
630 first latching element receiving pivot knuckle segment
632 first pivot knuckle pin receiving bore
635 first latching element receiving pivot knuckle segment length
640 second latching element receiving pivot knuckle segment
642 second pivot knuckle pin receiving bore
645 second latching element receiving pivot knuckle segment length
650 pivotal latching element
655 pivotal latching element length
660 latching element knuckle 662 latching element knuckle bore
664 latching element knuckle radial centerline
670 strap attachment tab
672 strap receiving slot
674 working clearance
680 latching element hinge assembly pin
682 hinge pin elongated shaft
684 hinge pin head
690 tie down strap

What is claim is:

1. A flatbed vehicle carrier body assembly for loading a vehicle thereon, the flatbed vehicle carrier body assembly comprising:
   a pair of carrier tie down strap receiving edge rails having a loading end, an opposite proximal end, a carrier bed facing surface, and an exterior surface, at least one of said pair of carrier tie down strap receiving edge rails comprise at least one slot formed within said carrier bed facing surface of said edge rails, said at least one slot extending between said loading end and said opposite proximal end of each carrier tie down strap receiving edge rail;
   said at least one slot includes at least one slot undercut, said at least one slot undercut is selected from a group of slot undercuts consisting of:
      (a) an upper undercut formed along an upper edge of said at least one slot, said upper undercut defining a upper hook receptacle cantilevered arm, and
      (b) a lower undercut formed along a lower edge of said at least one slot, said lower undercut defining a lower hook receptacle cantilevered arm; and
   at least one sliding latching element assembly, wherein each of said at least one sliding latching element assembly includes:
      a sliding latching base element having:
         at least one sliding flange extending outward from a sliding latching base body of each of said at least one sliding latching element assembly, wherein each said at least one sliding flange is sized and shaped to slideably engage with and be retained within said at least one slot undercut, and
         a strap attachment element, said strap attachment element pivotally assembled to said sliding latching base element;
      a pivotal assembly comprising:
         at least one first pivot element formed on an exterior surface of said sliding latching base body, the first pivot element having a pin receiving bore passing axially therethrough,
      a pivotal latching element comprising:
         at least one mating pivot element having a mating pin receiving bore passing axially therethrough,
         said strap attachment element including a strap attachment tab integral with said mating pivot element, and
         a strap receiving slot formed through said strap attachment tab; and
      a latching element hinge assembly pin,
      wherein said latching element hinge assembly pin extends through said pin receiving bore of each said at least one first pivot element and each of said at least one mating pin receiving bore forming a hinge assembly,
      wherein said hinge assembly pivotally assembles said strap attachment element and said sliding latching base element to one another, and
   wherein said body of each sliding latching base element is slideably assembled within said associated slot of said carrier tie down strap receiving edge rail, and each sliding flange is slideably assembled within said associated slot undercut; and;
   a carrier body supporting surface spanning between the pair of carrier tie down strap receiving edge rails for transporting a vehicle, said carrier body supporting surface extending between a proximal end located proximate said rail proximal ends and a loading end located between said rail proximal ends and said rail loading ends,
   wherein said flatbed vehicle carrier body assembly is adapted for mounting to a truck for loading and transporting a vehicle.

2. A flatbed vehicle carrier body assembly for loading a vehicle thereon as recited in claim 1, said at least one slot includes said upper undercut,
   wherein said upper hook receptacle cantilevered arm extends generally parallel to an upper hook receptacle base element of a main body of said carrier tie down strap receiving edge rail, wherein said upper hook receptacle cantilevered arm and said associated upper hook receptacle base element are oriented extending generally downward towards an insertion opening of said upper undercut.

3. A flatbed vehicle carrier body assembly for loading a vehicle thereon as recited in claim 1, said at least one slot includes said lower undercut,
   wherein said lower hook receptacle cantilevered arm extends generally parallel to a lower hook receptacle base element of a main body of said carrier tie down strap receiving edge rail, wherein said lower hook receptacle cantilevered arm and said associated lower hook receptacle base element are oriented extending generally upward towards an insertion opening of said lower undercut.

4. A flatbed vehicle carrier body assembly for loading a vehicle thereon as recited in claim 3, said flatbed vehicle carrier body assembly includes a flat hook, wherein said flat hook is formed having a hook strap retaining segment and a hook engaging tab segment, wherein said hook engaging tab segment is inserted into one of said at least one slot undercut.

5. A flatbed vehicle carrier body assembly for loading a vehicle thereon as recited in claim 1,
   wherein said at least one first pivot element is provided as a pair of latching element receiving pivot knuckle segments, and
   said pivotal assembly further comprising a pivotal latching element receiving section intermediately located between said pair of latching element receiving pivot knuckle segments,
   wherein said at least one mating pivot element is provided as a latching element knuckle,
   wherein said latching element knuckle is located within said pivotal latching element receiving section.

6. A flatbed vehicle carrier body assembly for loading a vehicle thereon as recited in claim 1, said flatbed vehicle carrier body assembly further comprising:
   a first pivotal member located proximate a loading end of each of said carrier tie down strap receiving edge rails;
   a carrier body pivotal ramp assembly comprising:
      a carrier body ramp flooring, said carrier body ramp flooring having a carrier body ramp distal end and a carrier body ramp loading end,
      a second pivot member assembled to said carrier body ramp loading end, wherein said carrier body pivotal ramp assembly is assembled to said carrier body assembly by pivotally engaging said first and second pivot members, wherein said ramp distal end is positioned proximate a loading end of said carrier body supporting surface.

7. A method of securing at least one of a vehicle and cargo to a flatbed vehicle carrier body assembly on a flatbed carrier vehicle, the method comprising steps of:
locating said flatbed carrier vehicle proximate at least one of said vehicle and said cargo to be loaded thereon, wherein said flatbed vehicle carrier body assembly comprises:
a pair of carrier tie down strap receiving edge rails having a loading end, an opposite proximal end, a carrier bed facing surface, and an exterior surface, at least one of said pair of carrier tie down strap receiving edge rails comprise at least one slot formed within said carrier bed facing surface of said edge rails, said at least one slot extending between said loading end and said opposite proximal end of each carrier tie down strap receiving edge rail, wherein said at least one slot is adapted for receiving at least one of:
a flat hook designed to be assembled to a tie down strap, and
a sliding latching element assembly; and
a carrier body supporting surface spanning between the pair of carrier tie down strap receiving edge rails for transporting a vehicle, said carrier body supporting surface extending between a proximal end located proximate said rail proximal ends and a loading end located between said rail proximal ends and said rail loading ends,
loading said at least one of said vehicle and said cargo onto said carrier body supporting surface;
obtaining a tie down strap comprising a tensioning mechanism;
obtaining a latching element, the latching element being at least one of a flat hook and a component of said sliding latching element assembly;
coupling said tie down strap and said latching element to one another;
routing said tie down strap to secure one of said at least one of said vehicle and said cargo;
securing said tie down strap to one of said pair of carrier tie down strap receiving edge rails by securing said tie down strap to said latching element and coupling said latching element to said slot of said associated carrier tie down strap receiving edge rail of said pair of carrier tie down strap receiving edge rails; and
tightening said tie down strap using said tensioning mechanism.

8. A method of securing at least one of a vehicle and cargo to a flatbed vehicle carrier body assembly on a flatbed carrier vehicle as recited in claim 7, wherein said latching element is a hook comprising a strap retaining segment and an engaging tab segment,
wherein said step of coupling said tie down strap and said latching element to one another is accomplished by coupling said tie down strap and said strap retaining segment to one another, and
wherein said step of securing said tie down strap to one of said pair of carrier tie down strap receiving edge rails is accomplished by inserting said engaging tab segment into a hook receptacle formed within said slot.

9. A method of securing at least one of a vehicle and cargo to a flatbed vehicle carrier body assembly on a flatbed carrier vehicle as recited in claim 7, wherein said slot is configured including at least one of:
an upper hook receptacle defined by an upper hook receptacle cantilevered arm of said carrier tie down strap receiving edge rail, said upper hook receptacle cantilevered arm extending generally parallel to an upper hook receptacle base segment of a main body of said carrier tie down strap receiving edge rail, wherein said upper hook receptacle cantilevered arm and said associated upper hook receptacle base segment are oriented extending generally downward towards an insertion opening of said upper hook receptacle, said upper hook receptacle cantilevered arm extending in a cantilevered arrangement from said carrier tie down strap receiving edge rail at an end of said upper hook receptacle cantilevered arm opposite said insertion opening, and
a lower hook receptacle defined by a lower hook receptacle cantilevered arm of said carrier tie down strap receiving edge rail, the lower hook receptacle cantilevered arm extending generally parallel to a lower hook receptacle base segment of a main body of said carrier tie down strap receiving edge rail, wherein said lower hook receptacle cantilevered arm and said associated lower hook receptacle base segment are oriented extending generally upward towards an insertion opening of said lower hook receptacle, said lower hook receptacle cantilevered arm extending in a cantilevered arrangement from said carrier tie down strap receiving edge rail at an end of said lower hook receptacle cantilevered arm opposite said insertion opening,
wherein said latching element is a hook comprising a strap retaining segment and an engaging tab segment,
wherein said step of coupling said tie down strap and said latching element to one another is accomplished by coupling said tie down strap and said strap retaining segment of said hook to one another, and
wherein said step of securing said tie down strap to one of said pair of carrier tie down strap receiving edge rails is accomplished by inserting said engaging tab segment of said hook into one of said upper hook receptacle of said slot or said lower hook receptacle of said slot.

10. A method of securing at least one of a vehicle and cargo to a flatbed vehicle carrier body assembly on a flatbed carrier vehicle as recited in claim 7, wherein said slot is formed including at least one undercut, said at least one undercut is selected from a group of undercuts comprising:
(a) an upper undercut formed along an upper edge of said at least one slot, said upper undercut defining a upper hook receptacle cantilevered arm, and
(b) a lower undercut formed along a lower edge of said at least one slot, said lower undercut defining a lower hook receptacle cantilevered arm,
wherein said tie down strap is a sliding element tie down strap, and wherein said latching element is a sliding latching element assembly, wherein said sliding latching element assembly includes:
a sliding latching base element having at least one sliding flange extending outward from a sliding latching base body, wherein said each of said at least one sliding flange is sized and shaped to slideably engage with and be retained within said at least one slot undercut, and a tie down strap attachment feature, wherein said tie down strap attachment feature is carried by said sliding latching base element;

the method further comprising a step of:

slideably assembling said sliding latching base element within said slot by inserting each of said at least one sliding flange into an associated said at least one slot undercut, wherein said step of coupling said tie down strap and said latching element to one another is accomplished by coupling said sliding element tie down strap and said tie down strap attachment feature to one another.

11. A method of securing at least one of a vehicle and cargo to a flatbed vehicle carrier body assembly on a flatbed carrier vehicle as recited in claim 10, wherein one of said at least one slot undercut is configured to be at least one of:

an upper hook receptacle defined by an upper hook receptacle cantilevered arm of said carrier tie down strap receiving edge rail, said upper hook receptacle cantilevered arm extending generally parallel to an upper hook receptacle base segment of a main body of said carrier tie down strap receiving edge rail, wherein said upper hook receptacle cantilevered arm and said associated upper hook receptacle base segment are oriented extending generally downward towards an insertion opening of said upper hook receptacle, said upper hook receptacle cantilevered arm extending in a cantilevered arrangement from said carrier tie down strap receiving edge rail at an end of said upper hook receptacle cantilevered arm opposite said insertion opening, and a lower hook receptacle defined by a lower hook receptacle cantilevered arm of said carrier tie down strap receiving edge rail, the lower hook receptacle cantilevered arm extending generally parallel to a lower hook receptacle base segment of a main body of said carrier tie down strap receiving edge rail, wherein said lower hook receptacle cantilevered arm and said associated lower hook receptacle base segment are oriented extending generally upward towards an insertion opening of said lower hook receptacle, said lower hook receptacle cantilevered arm extending in a cantilevered arrangement from said carrier tie down strap receiving edge rail at an end of said lower hook receptacle cantilevered arm opposite said insertion opening, wherein said latching element is a hook comprising a strap retaining segment and an engaging tab segment, the method further comprising steps of:

obtaining a hook tie down strap comprising an associated tensioning mechanism;

coupling said hook tie down strap and said strap retaining segment of said hook to one another, and wherein said step of securing said tie down strap to one of said pair of carrier tie down strap receiving edge rails is accomplished by inserting said engaging tab segment of said hook into one of said upper hook receptacle or said lower hook receptacle of said slot.

12. A method of securing at least one of a vehicle and cargo to a flatbed vehicle carrier body assembly on a flatbed carrier vehicle as recited in claim 7, said slot including at least one undercut, said at least one undercut is selected from a group of undercuts comprising:

(a) an upper undercut formed along an upper edge of said at least one slot, said upper undercut defining a upper hook receptacle cantilevered arm, and (b) a lower undercut formed along a lower edge of said at least one slot, said lower undercut defining a lower hook receptacle cantilevered arm, wherein said tie down strap is a sliding element tie down strap, said sliding element tie down strap comprising:

a sliding latching base element having:

at least one sliding flange extending outward from a sliding latching base body, wherein said each of said at least one sliding flange is sized and shaped to slideably engage with and be retained within said at least one slot undercut, at least one first pivot element formed on an exterior surface of said sliding latching base body, each of said at least one first pivot element having a pin receiving bore passing axially therethrough, a pivotal latching element comprising:

at least one mating pivot element having a mating pin receiving bore passing axially therethrough, and a tie down strap attachment feature carried by said mating pivot element, and a latching element hinge assembly pin, wherein said latching element hinge assembly pin extends through said pin receiving bore of each of said at least one first pivot element and through said mating pin receiving bore of each of said at least one mating pivot element of said latching element forming a hinge assembly, wherein said hinge assembly pin pivotally assembles said latching element and said sliding latching base element to one another;

the method further comprising a step of:

slideably assembling said sliding latching base element within said slot by inserting each of said at least one sliding flange into an associated said at least one slot undercut, wherein said step of coupling said tie down strap and said latching element to one another is accomplished by coupling said sliding element tie down strap and said tie down strap attachment feature to one another.

13. A method of securing at least one of a vehicle and cargo to a flatbed vehicle carrier body assembly on a flatbed carrier vehicle as recited in claim 12, wherein a first portion of said at least one slot undercut of said slot is configured including an upper hook receptacle defined by said upper hook receptacle cantilevered arm extending generally parallel to an upper hook receptacle base segment of a main body of said carrier tie down strap receiving edge rail, wherein said upper hook receptacle cantilevered arm and said associated upper hook receptacle base element are oriented extending generally downward towards an insertion opening of said upper hook receptacle, a second portion of said at least one slot undercut of said slot is configured including said lower hook receptacle defined by said lower hook receptacle cantilevered arm extending generally parallel to a lower hook receptacle base segment of said main body of said carrier tie down strap receiving edge rail, wherein said lower hook receptacle cantilevered arm and said associated lower hook receptacle base element are oriented extending generally upward towards an insertion opening of said lower hook receptacle, and wherein said latching element is a hook comprising a strap retaining segment and an engaging tab segment, further comprising steps of:

obtaining a hook tie down strap comprising an associated tensioning mechanism;

coupling said hook tie down strap and said hook to one another;

coupling said hook tie down strap and said strap retaining segment of said hook to one another, and wherein said step of securing said tie down strap to one of said pair of carrier tie down strap receiving edge rails is accomplished by inserting said engaging tab segment of said hook into one of said upper hook receptacle and said lower hook receptacle of said slot.

14. A method of securing at least one of a vehicle and cargo to a flatbed vehicle carrier body assembly on a flatbed carrier vehicle as recited in claim 7, said flatbed vehicle carrier body assembly further comprising:

a first pivot member located proximate a loading end of each of said carrier tie down strap receiving edge rails;

a carrier body pivotal ramp assembly comprising:
  a carrier body ramp flooring, said carrier body ramp flooring having a ramp distal end and a carrier body ramp loading end,
  a second pivot member assembled to said carrier body ramp loading end, and
  ramp edge member extending rearward from said carrier body ramp loading end, wherein said carrier body pivotal ramp assembly is assembled to said carrier body assembly by pivotally engaging said first pivot member and said second pivot member, wherein said ramp distal end is positioned proximate a loading end of said carrier body supporting surface;

the method further comprising steps of:

rotating said ramp distal end of said carrier body pivotal ramp assembly downward into an initial loading position;

loading a first portion of said vehicle onto said carrier body pivotal ramp assembly;

rotating said ramp distal end of said carrier body pivotal ramp assembly upward into a second loading position; and loading a balance of said vehicle onto said carrier body pivotal ramp assembly.

15. A flatbed vehicle carrier body assembly for loading a vehicle thereon, the flatbed vehicle carrier body assembly comprising:

a pair of carrier tie down strap receiving edge rails having a loading end, an opposite proximal end, a carrier bed facing surface, and an exterior surface, at least one of said pair of carrier tie down strap receiving edge rails comprise at least one slot formed within said carrier bed facing surface of said edge rails, said at least one slot extending between said loading end and said opposite proximal end of each carrier tie down strap receiving edge rail;

said at least one slot is formed including a pair of slot undercuts, said pair of slot undercuts includes:
  an upper undercut formed along an upper edge of said at least one slot, said upper undercut defining a upper hook receptacle cantilevered arm, and
  a lower undercut formed along a lower edge of said at least one slot, said lower undercut defining a lower hook receptacle cantilevered arm; and said flatbed vehicle carrier assembly comprises at least one sliding latching element assembly, wherein each of the at least one sliding latching element assembly includes:
  a sliding latching base element having a pair of sliding flanges, each said sliding flange of said pair of sliding flanges extending outward from a sliding latching base body, wherein said each of said pair of sliding flanges is sized and shaped to slideably engage with and be retained within a respective slot undercut of said pair of slot undercuts, and
  a strap attachment feature carried by said sliding latching base element; and
  a latching element hinge assembly pin pivotally assembling said strap attachment feature and said sliding latching base element to one another, wherein said sliding latching base body of each sliding latching base element is slideably assembled within said associated slot of said carrier tie down strap receiving edge rail, and each sliding flange of said pair of sliding flanges is slideably assembled within said associated slot undercut of said pair of slot undercuts;

a carrier body supporting surface spanning between the pair of carrier tie down strap receiving edge rails for transporting a vehicle, said carrier body supporting surface extending between a proximal end located proximate said rail proximal ends and a loading end located between said rail proximal ends and said rail loading ends, wherein said flatbed vehicle carrier body assembly is adapted for mounting to a truck for loading and transporting a vehicle.

16. A flatbed vehicle carrier body assembly for loading a vehicle thereon as recited in claim 15, wherein said strap attachment feature is pivotally assembled to said sliding latching base element.

17. A flatbed vehicle carrier body assembly for loading a vehicle thereon as recited in claim 15, each of the at least one sliding latching element assembly includes:
  said sliding latching base element having:
    a pair of latching element receiving pivot knuckle segments formed on an exterior surface of said sliding latching base body, each of said pair of latching element receiving pivot knuckle segments having a pin receiving bore passing axially therethrough, and
    a strap attachment element receiving section intermediately located between said pair of latching element receiving pivot knuckle segments;
  said strap attachment feature comprising:
    a latching element knuckle having a latching element knuckle bore passing axially therethrough,
    a strap attachment tab carried by said latching element knuckle, and
    a strap receiving slot formed through said strap attachment tab.

18. A method of securing at least one of a vehicle and cargo to a flatbed vehicle carrier body assembly on a flatbed carrier vehicle as recited in claim 7, said slot including a pair of slot undercuts, said pair of slot undercuts includes:

(a) an upper undercut formed along an upper edge of said at least one slot, said upper undercut defining a upper hook receptacle cantilevered arm, and (b) a lower undercut formed along a lower edge of said at least one slot, said lower undercut defining a lower hook receptacle cantilevered arm, wherein said tie down strap is a sliding element tie down strap, and wherein said latching element is a sliding latching element assembly, wherein said sliding latching element assembly includes:
  a sliding latching base element having a pair of sliding flanges, each sliding flange of said pair of sliding flanges extending outward from a sliding latching base body, wherein each said sliding flange is sized and shaped to slideably engage with and be retained within a respective slot undercut of said pair of slot undercuts, and a tie down strap attachment feature, wherein said tie down strap attachment feature is carried by said sliding latching base element;

the method further comprising a step of:

slideably assembling said sliding latching base element within said slot by inserting each of said pair of sliding flanges into said respective slot undercut of said pair of slot undercuts, wherein said step of coupling said tie down strap and said latching element to one another is accomplished by coupling said sliding element tie down strap and said tie down strap attachment feature to one another.

19. A method of securing at least one of a vehicle and cargo to a flatbed vehicle carrier body assembly on a flatbed carrier vehicle as recited in claim 7, said slot including a pair of slot undercuts, said pair of slot undercuts includes:

(a) an upper undercut formed along an upper edge of said at least one slot, said upper undercut defining a upper hook receptacle cantilevered arm, and (b) a lower undercut formed along a lower edge of said at least one slot, said lower undercut defining a lower hook receptacle cantilevered arm, wherein said tie down strap is a sliding element tie down strap, and wherein said latching element is a sliding latching element assembly, wherein said sliding latching element assembly includes:

a sliding latching base element having a pair of sliding flanges, each sliding flange of said pair of sliding flanges extending outward from a sliding latching base body, wherein each said sliding flange is sized and shaped to slideably engage with and be retained within a respective slot undercut of said pair of slot undercuts, and a tie down strap attachment feature, wherein said tie down strap attachment feature is pivotally assembled to said sliding latching base element;

the method further comprising a step of:

slideably assembling said sliding latching base element within said slot by inserting each of said pair of sliding flanges into said respective slot undercut of said pair of slot undercuts, wherein said step of coupling said tie down strap and said latching element to one another is accomplished by coupling said sliding element tie down strap and said tie down strap attachment feature to one another.

20. A method of securing at least one of a vehicle and cargo to a flatbed vehicle carrier body assembly as recited in claim 12, wherein said at least one first pivot element is provided as a pair of latching element receiving pivot knuckle segments, said sliding latching base body further comprising a pivotal latching element receiving section intermediately located between said pair of latching element receiving pivot knuckle segments, wherein said at least one mating pivot element is provided as a latching element knuckle, wherein said latching element knuckle is located within said pivotal latching element receiving section.

* * * * *